United States Patent
Vempaty et al.

(10) Patent No.: US 11,620,993 B2
(45) Date of Patent: Apr. 4, 2023

(54) MULTIMODAL INTENT ENTITY RESOLVER

(71) Applicant: Merlyn Mind, Inc., New York, NY (US)

(72) Inventors: Aditya Vempaty, Yorktown Heights, NY (US); Ravindranath Kokku, Yorktown Heights, NY (US); Tamer Abuelsaad, Fishkill, NY (US); Sharad C. Sundararajan, Union City, NJ (US); Satyanarayana Nitta, Cross River, NY (US)

(73) Assignee: Merlyn Mind, Inc., New York, NY (US)

( * ) Notice: Subject to any disclaimer, the term of this patent is extended or adjusted under 35 U.S.C. 154(b) by 77 days.

(21) Appl. No.: 17/342,989

(22) Filed: Jun. 9, 2021

(65) Prior Publication Data

US 2022/0399008 A1    Dec. 15, 2022

(51) Int. Cl.
*G10L 15/187*     (2013.01)
*G10L 15/18*      (2013.01)
(Continued)

(52) U.S. Cl.
CPC .............. *G10L 15/187* (2013.01); *G06N 5/04* (2013.01); *G10L 15/10* (2013.01);
(Continued)

(58) Field of Classification Search
CPC ... G10L 15/187; G10L 15/10; G10L 15/1815; G10L 15/22; G10L 2015/088; G10L 2015/223; G06N 5/04
(Continued)

(56) References Cited

U.S. PATENT DOCUMENTS 6,070,140 A * 5/2000 Tran .................... G06F 3/167
                                                      704/E15.045
6,324,513 B1 * 11/2001 Nagai .................... G10L 15/22
                                                      704/E15.04

(Continued)

FOREIGN PATENT DOCUMENTS

WO   WO 2016/122942     8/2016

OTHER PUBLICATIONS

The International Searching Authority, "Search Report" in Application No. PCT/US2022/027386, dated Jul. 26, 2022, 15 pages.

*Primary Examiner* — Thuykhanh Le
(74) *Attorney, Agent, or Firm* — Duane Morris LLP

(57) ABSTRACT

Interpretation of user commands is accelerated through digital user interfaces of various modalities, including generation and presentation of command modifications for rapid correction of incomplete or erroneous user commands. An embodiment detects whether the interpreted command is accurate and, if inaccurate, precisely what was the intended command or, at least, what suggested modification to the interpreted command would be sufficient to match the intent of the user. Disambiguation occurs that entails multiple recommendation generators proposing modified commands that may more accurately reflect the intent of the user. The user may provide a response that is either a confirmation of which one of several modified commands that were automatically proposed does the user intend or a correction that computer device may use to filter or replace currently offered modified commands to generate improved modified commands. By iterative refinement, the user and computer device may quickly agree on an accurate command that the computer device should execute.

20 Claims, 12 Drawing Sheets

901 Automatically select speculative command from modified commands

902 Detect that execution of speculative command is reversible

903 Before receiving response provided by user, execute speculative command

904 Roll back speculative command when accepted command is not speculative command

(51) Int. Cl.
*G10L 15/22* (2006.01)
*G06N 5/04* (2006.01)
*G10L 15/10* (2006.01)
*G10L 15/08* (2006.01)

(52) U.S. Cl.
CPC .......... *G10L 15/1815* (2013.01); *G10L 15/22* (2013.01); *G10L 2015/088* (2013.01); *G10L 2015/223* (2013.01)

(58) Field of Classification Search
USPC ........................................................ 704/251
See application file for complete search history.

(56) References Cited

U.S. PATENT DOCUMENTS

| | | | | |
|---|---|---|---|---|
| 6,405,170 | B1* | 6/2002 | Phillips | G10L 15/22 704/E15.04 |
| 10,002,613 | B2* | 6/2018 | Rubin | G06F 21/46 |
| 10,438,593 | B2* | 10/2019 | Alvarez Guevara | G10L 17/18 |
| 2002/0116196 | A1* | 8/2002 | Tran | G06F 1/3203 704/E15.045 |
| 2002/0184035 | A1* | 12/2002 | Hartley | G10L 15/22 704/E15.04 |
| 2005/0175159 | A1* | 8/2005 | Cooper | H04M 3/42204 704/E15.024 |
| 2006/0200347 | A1* | 9/2006 | Kim | G10L 15/22 704/E15.04 |
| 2007/0073540 | A1* | 3/2007 | Hirakawa | G10L 15/22 704/E15.04 |
| 2009/0319267 | A1* | 12/2009 | Kurki-Suonio | G10L 15/26 704/235 |
| 2011/0112836 | A1* | 5/2011 | Kurki-Suonio | H04M 3/42221 704/235 |
| 2011/0112837 | A1* | 5/2011 | Kurki-Suonio | G10L 15/22 704/235 |
| 2012/0035935 | A1* | 2/2012 | Park | G10L 15/22 704/E21.001 |
| 2013/0006629 | A1* | 1/2013 | Honda | G10L 15/187 704/E15.001 |
| 2015/0100313 | A1* | 4/2015 | Sharma | G10L 15/28 704/235 |
| 2015/0193379 | A1* | 7/2015 | Mehta | G10L 15/00 704/9 |
| 2015/0254057 | A1* | 9/2015 | Klein | H04N 21/4668 704/275 |
| 2016/0027436 | A1* | 1/2016 | Lee | G10L 15/22 704/236 |
| 2016/0110158 | A1* | 4/2016 | Park | G06F 3/167 715/708 |
| 2016/0125873 | A1* | 5/2016 | Braho | G10L 15/07 704/239 |
| 2016/0358603 | A1* | 12/2016 | Azam | G10L 15/26 |
| 2017/0357478 | A1* | 12/2017 | Piersol | G10L 15/30 |
| 2018/0364975 | A1* | 12/2018 | Kwong | G06F 3/167 |
| 2019/0156823 | A1* | 5/2019 | Naruse | G06F 3/167 |
| 2019/0339769 | A1* | 11/2019 | Cox | G06F 3/016 |
| 2020/0152188 | A1* | 5/2020 | Lee | G10L 15/22 |
| 2020/0320992 | A1* | 10/2020 | Yamasaki | G10L 21/0208 |
| 2021/0118077 | A1* | 4/2021 | Kuta | G06Q 10/06315 |
| 2021/0192384 | A1* | 6/2021 | Sidener | G05B 23/0221 |
| 2021/0249009 | A1* | 8/2021 | Manjunath | H04M 1/72469 |
| 2021/0265018 | A1* | 8/2021 | Dutta | G06N 3/08 |
| 2022/0236857 | A1* | 7/2022 | Sharifi | G06F 3/0481 |
| 2022/0327594 | A1* | 10/2022 | Farivar | G06Q 30/0204 |

\* cited by examiner

FIG. 10A

Command Log 1010

| Entry | Field A<br>Context | Field B<br>Input Device | Field C<br>Interpreted Command | Field D<br>Response Device | Field E<br>Response | Field F<br>Response Type | Field G<br>Accepted Command | Field H<br>Recommendation Generator |
|---|---|---|---|---|---|---|---|---|
| 1 | Browsing photos | Keyboard | Delete foto | Microphone | Third | Selection | Delete photo | Phonetic |
| 2 | | Microphone | Soon in | Keyboard | Z | Correction | Zoom in | Typographic |
| 3 | | Microphone | Zoom again | - | - | - | Zoom in | Semantic or Stateful |
| 4..7 | | ... | ... | ... | ... | ... | ... | ... |
| 8 | Composing email | Microphone | Copy Next Stage | Microphone | Yes | Selection | Copy Ned Sage | Phonetic |
| 9 | | Camera | Email | Microphone | Confirm send | Selection | Send email | Expansion |

MULTIMODAL INTENT ENTITY RESOLVER

FIELD OF THE DISCLOSURE

One technical field of the present disclosure is network-connected, multi-modal communication and human-computer interface. More specifically, one technical field is accelerating interpretation of user commands through digital user interfaces of various modalities. Another technical field is generation and presentation of command modifications to accelerate correction of incomplete or erroneous user commands.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, input and output devices regularly interact with humans. Typically, such devices are designed to satisfy individual needs or facilitate user online activities. Interactivity generally occurs by a user issuing commands for a system to execute. In a multimedia, multi-modal environment, a user command could involve processing certain data or operating certain devices. For example, the user command could be "Show the education presentation". Execution of the user command would involve loading the presentation and projecting the presentation via a screen and a speaker. For further example, the user command could be "Look up the term 'spatial computing' online". Execution of the user command would then involve submitting a query of "spatial computing" to an Internet search engine and present the search result via a screen or a speaker. A user command may be spoken, gestured, or typed, which may involve various input devices for various sensory modalities in various physical mediums. The result of the execution can be communicated via various output devices.

Often times, user input can be difficult to interpret for various reasons including environmental noise, intonations due to mood or accent, limited input device resolution or sensitivity, lossy digitization, poor lighting or angle, or limited processor bandwidth. Thus a user command, as programmatically received by the system, might not accurately reflect the user's original intent. In addition, a user command, such as keyboard input, may include errors. Even when a user command is accurately interpreted, the command may be incomplete or invalid.

Inaccurate or poorly interpreted commands may degrade the performance of the system and interfere with the operation of various input/output devices. Described herein are techniques to quickly assess the user intent to operate devices of the system to avoid the incorrect operation of a device, the operation of an incorrect device, or the operation of devices in an incorrect order. Clearly, executing a user command incorrectly may cause loss of data or time. In general, time spent automatically executing a user command is much less than the time spent interactively entering and refining the command. In that way, the speed of the system itself depends on how command entry and refinement occur, which is an ongoing technical challenge for interactive systems.

BRIEF DESCRIPTION OF THE DRAWINGS

In the drawings:

FIG. 10A is a block diagram that illustrates an example computer that may generate various feature vectors that encode one row or a few related rows of a command log as input to various machine learning (ML) models.

DETAILED DESCRIPTION

Figure 1:
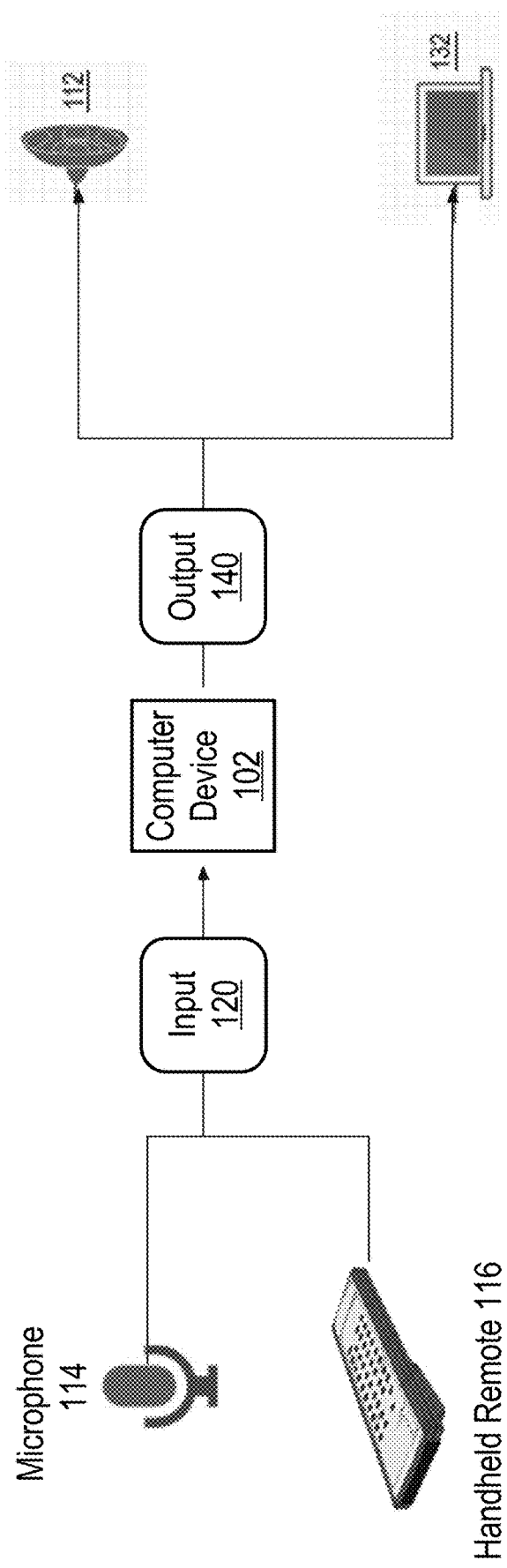
FIG. 1 illustrates an example interactive system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTING COMPONENTS
4. FUNCTIONAL DESCRIPTIONS
    4.1. USER COMMAND INTERPRETATION
    4.2. EXAMPLE DISPLAY
    4.3. EXAMPLE COMMAND INTERPRETATION PROCESS
    4.4. MULTIMODAL INTERACTIVITY
    4.5. INTERJECTION TRIGGERS AND COMMAND HISTORY
    4.6. INTERACTIVE CONTEXT
    4.7. SPECULATIVE EXECUTION 4.8. COMMAND LOG AND MACHINE LEARNING
5. HARDWARE IMPLEMENTATION
6. EXTENSIONS AND ALTERNATIVES 1. General Overview This application discloses techniques and servers that accelerate interpretation of user commands through digital user interfaces of various modalities, including generation and presentation of command modifications for rapid correction of incomplete or erroneous user commands. A server and connected devices may provide interactivity by receiving and executing user commands that are given by a user. The same command may be received by different input devices and by different modalities and mediums. For example, a command may be typed, spoken, or gestured, and the server transforms the raw command that was initially based on certain modalities into a canonical command that represents the intent of the user in a format that is independent of input modality.

In an embodiment, the user may speak an utterance into a microphone that injects the user command into the server as an initial command that may be captured as digitized audio content. By speech to text transcription or additional semantic translation, the initial command may be translated into an interpreted command that is a semantic representation of the content as recognized by the server. Due to ambiguity or interference as discussed earlier, the server detects: a) whether the interpreted command is accurate and, if inaccurate, b) precisely what the intended command was or, at least, c) what suggested modification to the interpreted command would be sufficient to match the intent of the user.

In light of that uncertainty, the server performs disambiguation that entails multiple competing or cooperating recommendation generators proposing modified commands that may more accurately reflect the intent of the user. In various ways, the user may provide, through the same or a different input device, a response that is either: a) a confirmation of which one of several modified commands that were automatically proposed is what the user intends or b) a correction that the server may use to filter or replace currently offered modified commands to generate improved modified commands. Through intelligent recommendations to refine the commands, the user and server may quickly agree on an accurate command that should be executed. With a main purpose of the server being generating instructions for command execution, quickly and accurately interpreting and refining a user command accelerates the operation of the server. Likewise, increased accuracy of command interpretation increases the reliability of the server.

The server includes an architecture that: a) increases the accuracy of generated modified commands, which makes the server more reliable and b) by generation of more accurate modified commands, accelerates automatic proposal and manual acceptance of the modified command to be executed. For example, fewer iterative refinements in a sequence of modified commands may be needed to establish an accurate command. In other words, the server arrives at and executes an intended command faster than other approaches.

In an embodiment, the server implements a system of taking voice input from a user for actions by an input device. The voice input instruction is translated by an automatic speech recognition (ASR) engine, and interpreted by a natural language parsing (NLP) engine to derive user intent and relevant subjects. The interpreted voice instruction is provided to the user for modification, along with modification suggestions for selection using an input device such as a remote mouse. The suggestions for selection are provided based on phonetic-proximity initially and changed to character-based proximity if the user uses a keyboard to enter a correction, or provides a first letter of a word through voice.

Selection, by the user, of a particular output item, including a suggestion, can be done with a remote pointing device via another input mode. For example, a suggested modification can be selected by the pointing device or uttered via voice. User commands are categorized as "possible to roll back" or "harder to roll back". Commands that are possible to roll back are preemptively executed even before the command can be interactively corrected. Commands that cannot be rolled back are not executed till the user either makes the modification or cancels the opportunity for modification. Voice input transcription and generated recommendations are tuned based on the context or state of an application that the user is interacting with. The server maintains a log of corrections done by a user, and uses the corrections automatically to process future user commands.

In an embodiment, the server has, within its form factor, multiple input devices and output devices that facilitate user interaction. In an embodiment, those devices are peripherals that are not collocated with a headless implementation of the server. The user is collocated with input devices and output devices, but much or all of the analytics herein may be offloaded to a networked central server that is remotely located and is an implementation of the server. For example, the central server may separately and simultaneously serve many different kinds of peripheral devices of many users.

This application describes various usage scenarios, strategies and mechanisms for implementing recommendation generators that propose modified commands, and ways to arrange, filter, and refine modified commands after generation. In particular, this application describes a rich command log that may be sliced in various ways (e.g., by user, by time, etc.) for data mining and for data-driven behaviors such as personalization, contextualization, and machine learning (ML).

2. Example Computing Environments

FIG. 1 illustrates an example interactive system 100 in which various embodiments may be practiced. FIG. 1 is shown in simplified, schematic format for purposes of illustrating a clear example and other embodiments may include more, fewer, or different elements.

In some embodiments, the interactive system 100 comprises a computer device and an input/output (I/O) system, including one or more input devices 114 and 116, and one or more output devices 112 and 132. Computer device 102 ("server") can be communicatively coupled with each component of the I/O system via one or more networks or cables, wires, or other physical components.

In some embodiments, the computer device 102 broadly represents one or more computers, virtual computing instances, and/or instances of a server-based application that is programmed or configured with data structures and/or database records that are arranged to host or execute functions including but not limited to managing the I/O system, including connecting or disconnecting the I/O devices to enable communication of data inputted by the input devices to be outputted by the output devices. In certain embodiments, the computer device 102 can comprise a controller that provides a hardware interface for one or more components in the I/O system. For example, the computer device 102 can have an audio controller that communicates with I/O devices that handle audio data or a camera controller that specifically communicates with a camera. The computer device 102 is generally located near the user to help achieve real-time response.

In some embodiments, the I/O system can comprise any number of input devices and output devices. An input device typically includes a sensor to receive data shown as input 120, such as a handheld remote 116 that may include a keyboard to receive tactile signals, a camera to receive visual signals, or a microphone 114 to receive auditory signals. An output device is used to deliver data shown as output 140, such as a speaker 112 to produce auditory signals or a monitor 132 to produce visual signals. An integrated device integrates input features and output features and typically includes a camera, a microphone 114, a screen 132, and a speaker 112. Example of an integrated device include a desktop computer, laptop computer, tablet computer, smartphone, or wearable device. In general, one or more of the input devices can be selected to capture user actions in addition to or instead of other activities in the surroundings, where the capture data could form part of the context used to interpret the user commands or actions. In certain embodiments, any of the devices or any combination of the devices shown in FIG. 1 can be an integrated device or a part thereof. The computer device 102 and the components of the I/O system can be specifically arranged to maximize the human ergonomics and overall performance.

In various embodiments, computer device 102 is part of interactive system 100 that contains circuitry and/or wireless communication links that interconnect one or more input devices, one or more output devices, and one or more processors that execute instructions to operate the devices and perform techniques herein. Computer device 102 may have a fixed set of input devices and output devices or may be extensible by connecting additional devices wirelessly or by cable. For example, which devices are connected may depend on where computer device 102 is currently located. Embodiments of computer device 102 may entail form factors such as a television, a smartphone, a personal computer, a wearable or handheld device, a transportation vehicle, industrial equipment, a consumer computer device, a toy, or a game console. Interactive system 100 is operated by a user that uses the input devices and output devices of interactive system 100.

Input devices may include microphone 114, handheld remote 116, a keyboard, a mouse, a touch pad, a track ball, a joystick, a game controller, or a video camera. Handheld remote 116 may contain buttons, a full or partial keyboard, a gyroscope, or a directional beam. For example, handheld remote 116 may capture motion such as gestures or body movement. Microphone 114 may capture spoken sounds for which computer device 102 may perform ASR that may transcribe speech into text. The video camera may capture human motion that computer device 102 may interpret as gestures. Each input device operates as a sensor that digitizes activity that occurs in a respective physical sensory medium such as touch, sound, or sight. Multiple input devices may be combined. For example, handheld remote 116 may contain microphone 114.

Output devices may include a speaker 112, a video screen 132, such as a television or a heads-up display such as in a car or in augmented reality glasses, a tactile surface pad, or other devices that output signals that could be sensed and understood by a user. As indicated above, input devices and output devices may be integrated into a same form factor. For example, a laptop or smartphone may implement interactive system 100 and multiple input and output devices.

As discussed later herein, input 120 may be a user command that computer device 120 should interpret and execute. Output 140 may be results of executing the user command or, as discussed later herein, various modifications of the user command that might more accurately reflect the intent of the user such as when the user command is incomplete, invalid, or garbled. At other times, input 120 may be a response by the user to indicate acceptance of one of multiple modified commands that were automatically generated by computer device 102 or to indicate a correction for computer device 102 to automatically generate other modified commands. As illustrated in FIG. 1, interactive system 100 is multimodal such that input 120 may be received through input device 114 or 116 and output 140 may be delivered through output device 112 or 132. In some embodiments, the computer device 102 is programmed to continuously receive data from the input devices, such as the input devices 114 and 116. The computer device 102 is programmed to then identify and interpret a user command in terms of an action and infer the user intent.

In an embodiment, the user is collocated with the input devices and output devices that are part of a so-called thin client but much or all of the analytics herein by interactive system 100 is performed by a networked central server that is remotely located. For example, the central server may separately and simultaneously serve many different kinds of client devices of many users. At a minimum, a client device performs multimedia conversions such as analog to digital. Whether the client or server performs initial translation such as speech to text depends on the embodiment. In an embodiment, the server contains recommendation generators and a command log, as discussed later herein. Embodiments that are not client/server may be self-contained. For example, a smartphone embodiment may fully operate offline despite loss of wireless signal or airplane mode. Some self-contained embodiments may lack network connectivity by design.

3. Example Computer Components

Figure 2:
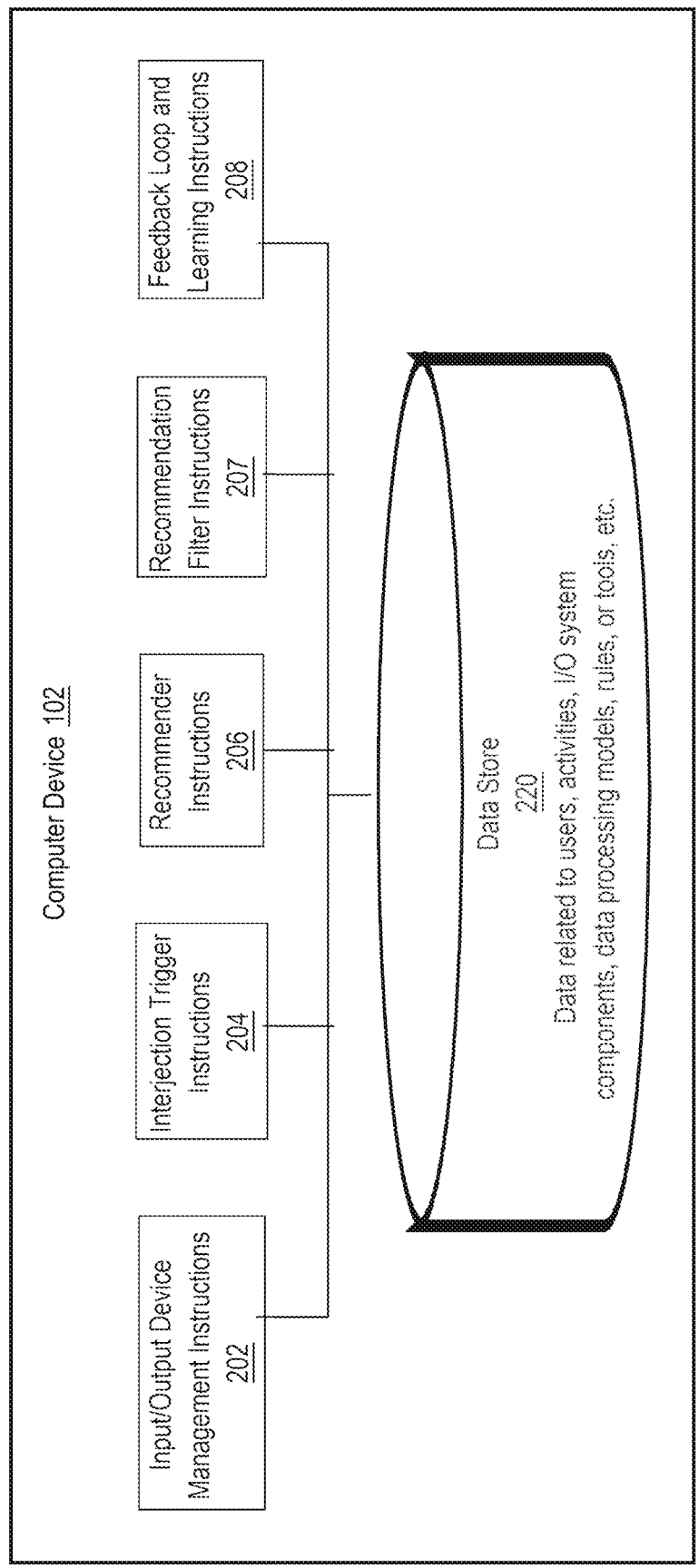
FIG. 2 illustrates example computer components of a computer device in accordance with the disclosed embodiments.

FIG. 2 illustrates example components of the computer device 102 in accordance with the disclosed embodiments. This figure is for illustration purposes only and the computer device 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the computer device 102 can comprise input/output device management instructions 202, interjection trigger instructions 204, recommender instructions 206, recommendation filter instructions 207, and feedback loop and learning instructions 208. In addition, the computer device 102 can comprise a data store 220.

In some embodiments, the input/output device management instructions 202 enable management of and communication with various input devices, output devices, integrated devices, or media devices. The management may include turning on or shutting off an I/O device, adjusting the sensitivity of an input device, adjusting the intensity of an output device, or connecting multiple input and/or output devices (which may include integrate devices or media devices herein). The communication can include receiving data regarding what is happening in the surroundings, including what the user is indicating, and conveying the process or result of analyzing the received data back to the user.

In some embodiments and as discussed later herein, the interjection trigger instructions 204 enable detection of opportunities to automatically generate various modifications of a user command. For example, computer device 102 may, via the interjection trigger instructions 204, detect when to engage particular behaviors presented herein.

In some embodiments, the recommender instructions 206 enable generation of various modifications of a user command based on various strategies and mechanisms for substituting portions of the user command with other details that may more accurately reflect the intent of the user.

In some embodiments, the recommendation filter instructions 207 enable discarding some modifications that were generated for a user command but that lack sufficient relevance to the intent of the user. Recommendation filter instructions 207 may act as a preprocessor of generated modifications to ensure that only the most relevant modifications are presented to the user as output 140.

In some embodiments, the data store 220 is programmed or configured to manage relevant data structures and store relevant data for functions performed by the computer device 102. The relevant data may include data related to the surroundings, users, activities, I/O system components, data processing models or tools, and so on. The data related to the I/O system components in particular can include handles or mechanisms for the system components, indications for connecting the I/O system components, or various rules for selecting or applying these handles, mechanisms, or indications, as further discussed below.

4. Functional Descriptions

4.1. User Command Interpretation

Figure 3:
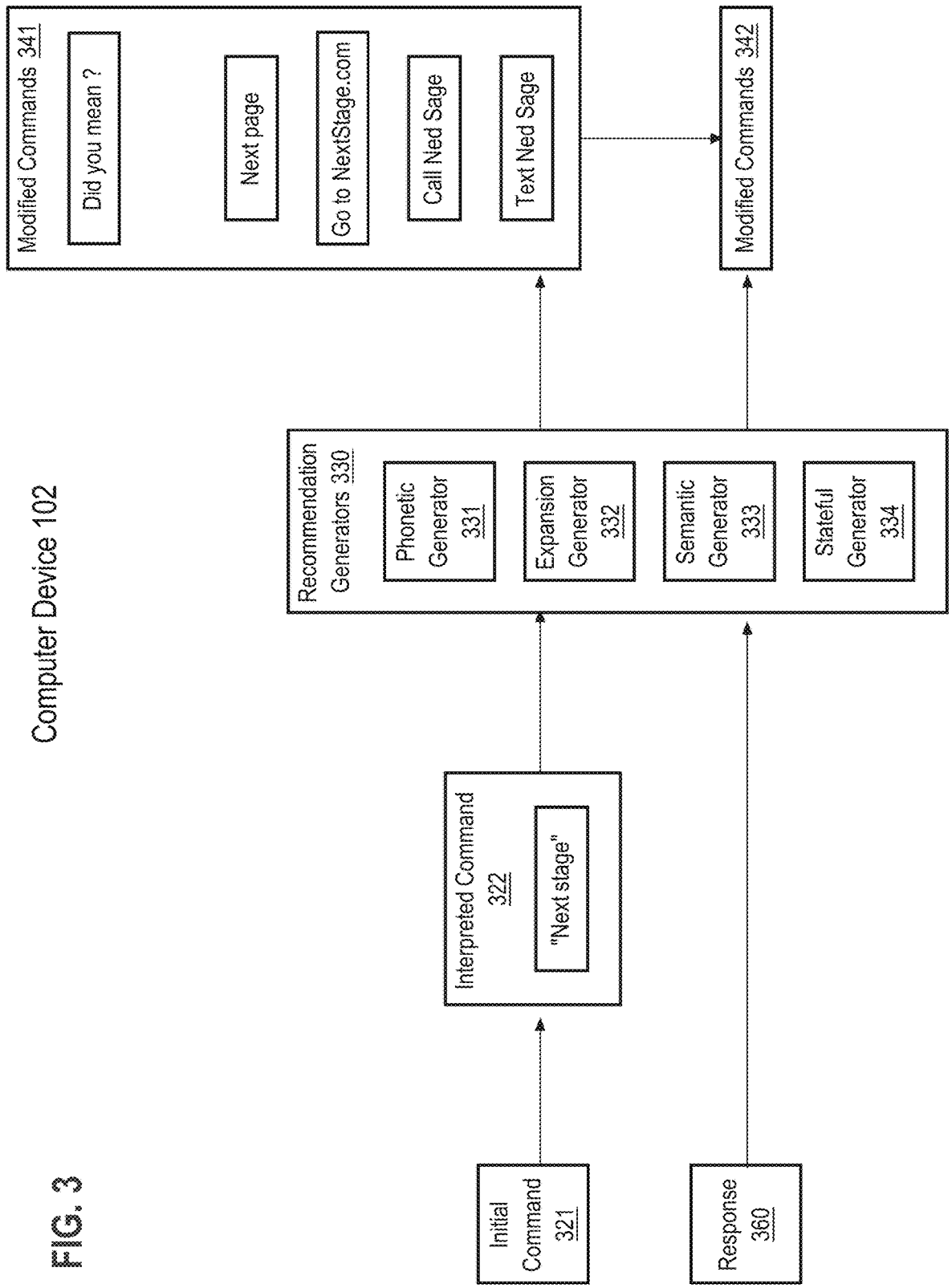
FIG. 3 illustrates an example interactive system in which various embodiments may be practiced to accelerate interpretation of user commands through digital user interfaces of various modalities, including generation and presentation of command modifications to accelerate correction of incomplete, garbled, or erroneous user commands.

FIG. 3 illustrates example operations of computer device 102 to accelerate interpretation of user commands through digital user interfaces of various modalities, including generation and presentation of command modifications to accelerate correction of incomplete, garbled, or erroneous user commands. Specifically, recommendation generators 330 are configured to execute recommender instructions 206 in FIG. 2. FIG. 3 is shown in simplified, schematic format for purposes of illustrating a clear example and other embodiments may include more, fewer, or different elements.

Applications in computer device 102 provide interactivity by receiving and executing user commands that are given by the user as input 120. Unlike other approaches, the same command may be received by alternate input devices corresponding to alternate modalities and mediums. For example, a command may be typed, spoken, or gestured and, as discussed later herein, computer device 102 transforms the raw command that was initially based on one or more particular modalities into a canonical command that represents the intent of the user in a format that is independent of input modalities.

For example, the user may speak an utterance into microphone 114 that injects the command into computer device 102 as initial command 321 that may contain digitized audio content. By speech-to-text transcription, initial command 321 is translated into interpreted command 322 that is a semantic representation of the content as recognized by computer device 102. In an embodiment, interpreted command 322 contains a text transcription such as a word, phrase, or sentence that reflects the utterance. For example as shown, computer device 102 heard the user utter "next stage" as a phrase. In an embodiment, interpreted command 322 additionally or instead contains a symbolic representation such as numeric codes or data structures that provide a denser encoding or an encoding that is more amenable to automatic analysis. Interpreted command 322 is a generalized representation that does not depend on which input device or modality originally received the command, although computer device 102 may track or log such details about command entry.

A technical problem is that transcription from initial command 321 into interpreted command 322 may be inaccurate for various reasons including environmental noise, intonations due to mood or accent, limited input device resolution or sensitivity, lossy digitization, poor lighting or angle, or limited processor bandwidth. Thus, interpreted command 322 may or may not accurately reflect the original utterance or gesture. Likewise, keyboarding may include typographic errors. Even when interpreted command 322 is accurate, interpreted command may be incomplete or invalid. Thus, computer device 102 may or may not be able to detect: a) whether interpreted command 322 is accurate and, if inaccurate, b) precisely what the original command was or, at least, c) what suggested modification to interpreted command 322 would be sufficient to match the intent of the user.

In light of that uncertainty, computer device 102 performs disambiguation that entails multiple recommendation generators 330 proposing modified commands 341 as follows. Each of recommendation generators 330 is different software including algorithms and data structures needed to generate one or more of modified commands 341 based on interpreted command 322. For example, phonetic generator 331 generates modified commands that would rhyme or sound similar to interpreted command 322. As a result, some of modified commands 341 may contain words "page" or "sage" that are phonetically similar to "stage" in interpreted command 322.

In an embodiment, phonetic generator 331 decomposes interpreted command 322 into a sequence of words and replaces one or more of the words in the sequence with replacement words that sound similar and thus generate a modified command that may have a different meaning than interpreted command 322. For example, phonetic generator 331 may change "next stage" into "next page". In that way, a correction to inaccurately recognized speech may be proposed. However, phonetic generator 331 is not limited to modifying only spoken commands. For example, a phonetic misspelling such as "foto" may be typed into a keyboard, and phonetic generator 331 may propose that the misspelling be phonetically corrected to "photo". Indeed, any of recommendation generators 330 may propose modifications to commands received from different input devices or modalities.

In an embodiment, expansion generator 332 may embed interpreted command 322 into one or more modified commands. For example, "left" may be expanded into "turn left" or, as shown, "next stage" may be expanded into "go to NextStage.com". In an embodiment, expansion generator may prepend, append, or insert words. For example, "turn here" may be expanded into "turn left here" in one modified command and expanded into "turn right here" in another modified command. Expansion generator 332 may propose a complete command based on a partial command. For example, expansion generator 332 can detect that the user command is not a full sentence using any natural language technique known to someone skilled in the art and thus would be a candidate for expansion. Expansion generator 332 can also determine that the user command is not one of previously processed user commands, is part of a previously processed user command, or is one that cannot be acted on. In addition, expansion generator 332 may have an inventory of reusable command fragments or verbs or object words that can be added to various partial commands. Expansion generator 332 may have generalized command templates that would be complete commands except for a placeholder for a phrase such as when interpreted command 322 consists solely of the phrase that may be combined with a template to generate a modified command.

In an embodiment, semantic generator 333 replaces one or more words in interpreted command 322 to generate one or more modified commands. In an embodiment, semantic generator 333 can: a) analyze the syntax of interpreted command such as by detecting the grammatical role (e.g. noun or verb) of each word in interpreted command 322 and b) replace one or more of those words with replacement words of a same grammatical role. For example, by word replacement, "next stage" may be changed into "next slide" or, as shown, "next page". Strategies for identifying replacement words are discussed later herein. For example, semantic generator 333 may detect that: a) "next" is an adjective for a sequence and b) only certain nouns may represent instances in a sequence. In an embodiment, natural language processing (NLP) is used to decompose and analyze interpreted command 322 syntactically and semantically. For example, semantic generator 333 may be based on NLP.

Various embodiments may have various implementations of stateful generator 334 whose behavior is based on various forms of recent or historical data that was recorded before initial command 321. For example, stateful generator 334 may track an ongoing session, dialog, conversation, or other sequence of interactions as discussed later herein. For example, a subsequent command may naturally complement an immediately or recently previous command. For example, interpreted command 332 may be something completely incomprehensible, or it may be something semantically or phonetically related to "stop timer" and other possible user commands. However, stateful generator 334 may propose or select "stop timer" as a modified command if a) a recent command was "start timer" or b) a timer is currently running. Stateful generator 334 could interact with improve the operation of other recommendation generators 330. For example, any of the other recommendation generators may have produced several candidate modified commands, and stateful generator 334 can be used to home in on the key candidates. In addition, stateful generator 334 can utilize the state information in various ways. One way is to look for a semantic relationship between a candidate modified command and a logged command, similar to part of how the semantic generator 333 operates. In the examiner above, the semantic relationship could be "logical next step". Some other examples are described below.

Alternatively, stateful generator 334 may track a full history of commands from the user, which may facilitate leveraging the user's habits and preferences. For example, the user may often ask interactive system 100 to read an email aloud before sending the email, in which case stateful generator 334 may propose "read email aloud" as a modified command if email composition is in progress by that user but not for another user whose command history is different. As discussed later herein, a command log may provide a history of (initial, modified, etc.) user commands for stateful generator 334 to analyze for detecting recurring corrections. For example, a spoken accent may necessitate a same transcription correction on separate occasions, which stateful generator 334 may detect and use to propose a same correction in the future as discussed later herein.

In an embodiment, the behavior of stateful generator 334 may be contextual. As discussed above, the interactive system 100 may detect that a timer is running or that an email is being composed. For further example, when interactive system 100 is playing a movie, stateful generator 334 may propose modified commands that are relevant to controlling the stream of the movie or relevant to inspecting the content or metadata of the movie. For example, stateful generator 334 may propose "restart scene" or "which stars" as modified commands. An embodiment may have multiple specialized stateful generators such as an instance of each of the example stateful generators discussed above.

In an embodiment, one recommendation generator may generate an additional modified command by modifying a proposed modified command that was suggested by a different recommendation generator for same interpreted command 322. For example, phonetic generator 331 may change "next stage" into "Ned Sage" that expansion generator 332 may expand into other modified commands such as "call Ned Sage" and "text Ned Sage" as shown. Despite effectively collaborating, generators 331-332 need not be aware of each other. For example, phonetic generator 331 need not be specially configured to generate modified commands that can be further modified by other generators. Likewise, expansion generator 332 need not be specially configured to accept already modified commands for further modification. Such cascaded integration between generators may be provided by computer device 102 without internal adjustment to the generators themselves.

Many or all of recommendation generators 330 may contribute respective subsets into modified commands 341 such that modified commands 341 may contain many choices as shown. Although computer device 102 may rank modified commands 341 according to factors such as suitability, reference, similarity, user preference, and interaction history as discussed later herein, modified commands 341 may effectively be speculative. To detect actual user intent, interactive system 100 presents modified commands 341 to the user to choose a particular modified command or, by interactive correction as discussed later herein, cause refinement and replacement of modified commands 341 with modified commands 342. In certain embodiments, in addition to the list of modified commands, an output could produce a prompt for the user to choose one of the modified mands. The output device could also produce additional options, such as "Don't see my command" or "Want to try again". The former case could trigger further actions by the recommendation generators 330. The latter case could trigger further actions by the component that translates the initial command to an interpreted command.

To detect actual user intent, interactive system 100 presents modified commands 341 to the user through an output device that has a modality such as sight or sound. For example, modified commands 341 may be visually displayed on monitor 132 or automatically spoken through speaker 112 by text to speech. In various embodiments, modified commands 341 may be transmitted to an output device as raw text, semi-structured text such as extensible markup language (XML) or JavaScript object notation (JSON), or as fully rendered multimedia content such as video or audio.

In various ways discussed later herein, the user may provide, through an input device of interactive system 100, response 360 to the modified commands 341 that can be: a) a confirmation of which one of modified commands 341 the user intends (not shown in the figure) or b) a correction that computer device 102 may use to filter or replace modified commands 341 to generate improved modified commands 342 that can be sent to an output device to repeat the interactive process of detecting the intended command of the user. In b), response 360 is fed into the recommendation generators in order to produce additional or refined modified commands 342. Any number of iterations may be needed for the user and computer device 102 to agree on a command that computer device 102 should execute. As discussed later herein, often interpreted command 322 may execute without any need for modified commands 341-342 nor response 360. That is, computer device 102 may immediately and directly execute interpreted command 322 in many cases.

Usage of interactive system 100 may entail execution of many related and unrelated user commands. For example, interactive system 100 may be used for different purposes at different times, and one use may entail multiple user commands such as in sequence. In volatile or persistent storage of computer device 102, a command log may be a log of how each interpreted command is handled. For example, the command log may be a table with an entry that represents each (initial command or modified) command as follows. For each received user command, a new entry may be appended to the command log to record how the command was handled.

The command log may store a sequence of entries that have various columns that record attributes of each command as follows. For a given entry in the command log, an interpreted command column records an interpreted command such as 322. A response device column records which of input devices 114 or 116 received the user's response to modified commands 341 when presented on an output device. For example, the user may have an oral conversation with interactive system 100 that entails initial command 321 and response 360 spoken into microphone 114. Alternatively, initial command 321 and response 360 may be received by different respective input devices. In other words, user participation may be multimodal. For example, different commands or different responses may be received by different input devices.

An entry in the command log may record that "newspaper" was generated as an interpreted command. A response type column may indicate that the user selected one of multiple modified commands that computer device 102 generated and presented because "newspaper" is not a complete command. The response device column indicates that the user visually gestured the selection (i.e., confirmation) of the modified command to a camera input device. For example, a nod of the head (when there is only recommended modification) or a raised thumb (pointing to one of the recommended modifications) may indicate confirmation. An accepted command column may indicate that "read newspaper" is the selected modified command. For example, a binary confirmation of acceptance such as a head nod may indicate acceptance of a first modified command in an ordered list of modified commands.

An entry in the command log may indicate that handling of spoken initial command 321 includes transcription as "next stage" and selection of "next page" as the one of modified commands 341 for execution. For example, response 360 may be a keystroke of letter 'P' that computer device 102 processed as a confirmation of the only one of modified commands 341 that contains a word that begins with P. Alternatively, response 360 may have caused computer device 102 to generate modified commands 342 from modified commands 341 by discarding modified commands that do not contain a word that starts with P and replacing them with new modified commands from recommendation generators 330 that do contain a word that starts with P. For example, the user's confirmation to accept "next page" for execution may have been in response to modified commands 342 instead of modified commands 341.

Discussed later herein are various usage scenarios, strategies and mechanisms for implementing recommendation generators 330, and ways to arrange, filter, and refine modified commands 341 after generation. Also presented herein is a richer command log than 370 that may be horizontally and vertically sliced in various ways for data mining and for data-driven behaviors such as personalization, contextualization, and machine learning. Included herein are various feature vectors that encode one row or a few related rows of a command log as input to a machine learning model. Historical log(s) of one or many users may be used for supervised training. After training, the machine learning model may use a log of a recent few commands in an ongoing interactive session to make predictions that accelerate command execution by predicting a modified command that is likely to be accepted by the user or predicting which one of recommendation generators 330 likely generates that modified command.

Thus, in significant ways discussed earlier and later herein, interactive system 100 includes an architecture that: a) increases the accuracy of generated modified commands, which makes interactive system 100 more reliable and b) by generation of more accurate modified commands, accelerates proposal and acceptance of the modified command to be executed. For example, fewer iterative refinements in a sequence such as modified commands 341-342 may be needed for initial command 321. In other words, interactive system 100 arrives at and executes an intended command faster than other approaches.

4.2. Example Display

Figure 4:
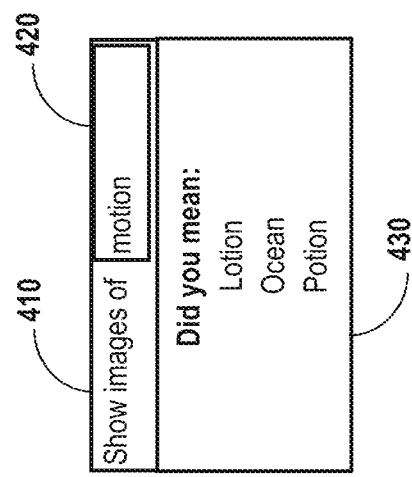
FIG. 4 illustrates an example display.

FIG. 4 illustrates an example display 400 that facilitates refinement of a user command. Display 400 may be a television, a monitor, an LED screen, or other visual rendering device. Display 400 may be rendered on monitor 132. FIG. 4 is discussed with reference to FIG. 3.

Display 400 may render various information in various stages of readiness including some or all of displayed portions 410, 420, and 430 at various times. In an embodiment, display 400 may render some or all of commands 322 and 341 at various times. For example, user command 322 may be displayed as two parts that are portions 410 and 420 as shown. For example, user command 322 may be automatically derived from a command template, rendered as portion 410, that contains a placeholder, rendered as portion 420, whose content may be entered to compose user command 322. For example, the command template may be automatically selected, such as when interactive system 100 has already detected that the user wants to see images based on a current interactive context or other recent user commands. Interactive contexts and command sequences are discussed later herein. Command templates are discussed earlier herein.

In other words, the user need not utter a whole command but may instead provide only portion 420 that can be automatically combined with portion 410 to form a whole user command 322. Likewise, instead of showing whole modified commands 341, portion 430 may contain portions of modified commands 341 that are modifications of portion 420. In this example, portions 430 contains multiple lines of text that include a prompt and multiple modification choices. In an embodiment, recommendation generators 330 may accept portions 410 and/or 420 as input and generate the modifications in portion 430 as output.

Response 360 by the user to the list of recommended modifications may indicate selection of one of the modifications in portion 430 to use as a replacement of portion 420. That is, based on response 360, an accepted command that is confirmed for execution may be automatically generated by combining portion 410 with the selected modification from portion 430. In another example, the user instead confirms that portion 420 is already correct and portion 430 may be discarded.

4.3. Example Command Interpretation Process

FIGS. 5-9 discussed below are shown in simplified, schematic format for purposes of illustrating a clear example and other embodiments may include more, fewer, or different elements connected in various manners. FIGS. 5-9 are intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge. FIGS. 5-9 are discussed with respect to FIG. 3.

Figure 5:
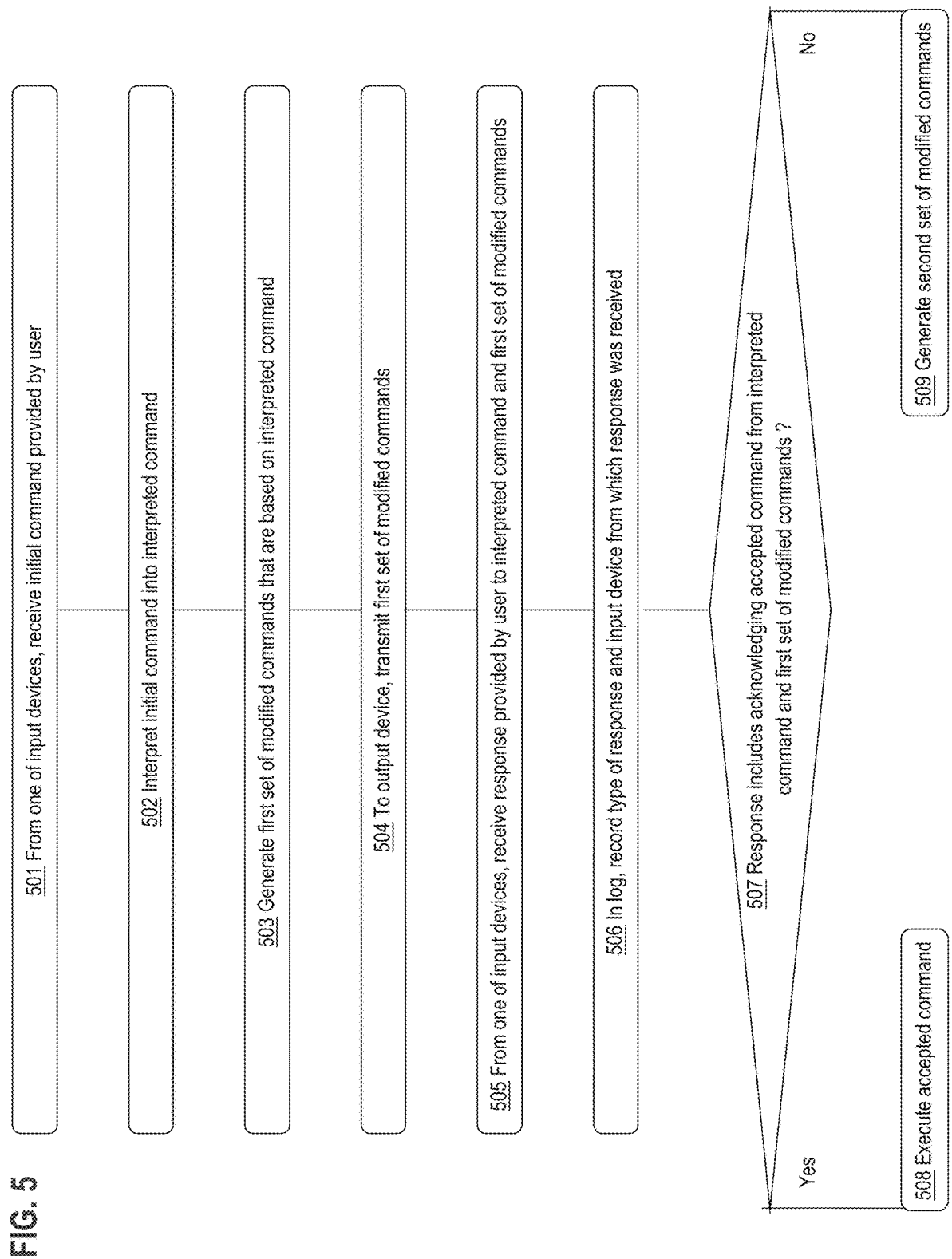
FIG. 5 illustrates an example computer process that accelerates processing of user commands through digital user interfaces of various modalities, including generation and presentation of command modifications to accelerate correction of incomplete, garbled, or erroneous user commands.

FIG. 5 illustrates an example process performed by an embodiment of interactive system 100 and specifically computer device 102 to accelerate processing of user commands through digital user interfaces of various modalities, including generation and presentation of command modifications to accelerate correction of incomplete, garbled, or erroneous user commands.

From one of input devices such as 114 or 116, the computer device 102 in step 501 receives initial command 321 as provided by the user. As discussed earlier herein, step 501 may entail activities such as analog to digital conversion of sound or sight and delivery, from the input device to the processor, of encoded multimedia content such as an audio or visual format.

In an embodiment, the computer device 102 in step 502 interprets initial command 321 into interpreted command 322. Interpretation in step 501 may include command preprocessing such as automatic speech recognition to transcribe speech to text, recognition of human motion such as a gesture made with or without movement of an input device, computer vision, or translation of a click, menu item selection, or pointing device interaction into a user command. As discussed earlier herein, interpreted command 322 may contain a textual and/or symbolic encoding of the command. A confidence score is a statistical probability that measures a likelihood that interpreted command 322 is accurate. User speech recognition can be performed using any technique known to someone skilled in the art which produces a confidence score. User gesture or movement recognition can be performed using any technique known to someone skilled in the art which similarly produces a confidence score.

If the interpreted command 322 meets certain criteria, as discussed below, such as a low confidence score, then computer device 102 proposes variations of interpreted command 322 that might better reflect the intent of the users. In an embodiment in step 503, recommendation generators 330 generate set of modified commands 341 that are based on interpreted command 322. As discussed earlier and later herein, each of generators 331-334 may generate, in various ways, a subset of modified commands 341. For example, with phonetic replacement based on algorithms such as Metaphone or Soundex, phonetic generator 331 may generate several modified commands that phonetically differ from interpreted command 322 by no more than a threshold amount of measurable phonetic distance, such as Levenshtein distance.

To an output device, the computer device 102 in step 504 transmits set of modified commands 341 to the output device in an embodiment. The set of modified commands 341 may be accompanied by additional information for presentation such as a visual prompt of "Did you mean?" and interpreted command 322 for direct editing or refinement by the user. The output device can visually or aurally present modified commands 341 to the user for consideration as discussed earlier herein.

From one of the input devices, the computer device 102 in step 505 receives response 360, as provided by the user, that may include one of various indications that computer device 102 may use to further process interpreted command 322 and/or set of modified commands 341 in various ways in an embodiment. For example, interpreted command 322 may have a low confidence score, and response 360 may confirm that interpreted command 322 is correct and that modified commands 341 are superfluous. Alternatively, response 360 may confirm that one of modified commands 341 is correct. Alternatively, response 360 may contain a correction that may be used to refine modified commands 341 such as discussed below for step 509.

In the command log, the computer device 102 in step 506 records various attributes of interpreted command 322 and/or response 360 such as the type of response and the input device from which response was received in an embodiment. Presented later herein is command log 1010 that demonstrates a rich set of interactivity attributes that may be recorded in volatile or persistent storage to improve the user's current context or support analytics such as data mining and machine learning, which can be performed offline and without user intervention.

In an embodiment, the computer device 102 in step 507 detects whether or not response 360 includes acknowledging an accepted command from one of interpreted command 322 and set of modified commands 341 as discussed above for step 505. If response 360 acknowledges acceptance of a command, then the computer device 102 in step 508 executes the accepted command and then is ready to receive a new related or unrelated initial command that may cause the process of FIG. 5 to recur by revisiting steps 501-509 for a next command.

If response 360 does not confirm acceptance, the computer device 102 in step 509 generates refined set of modified commands 342 that are based on interpreted command 322 and modified commands 341 such as discussed earlier and later herein. Depending on the user's further response to the modified commands, generation of refined commands may entail some or all of recommendation generators 330 and may entail strategies and mechanisms that the computer device 102 in step 503 used to generate modified commands 341. Presentation of the refined commands and acceptance or correction may occur in a same way as for modified commands 341. For example, step 509 may be followed by revisiting steps 504-509 for further iterative refinement and eventual confirmed acceptance of a command. Such revisiting may occur as many times as needed to generate and accept a modified command that the user indicates is accurate and ready for execution in step 508.

4.4. Multimodal Interactivity

Figure 6:
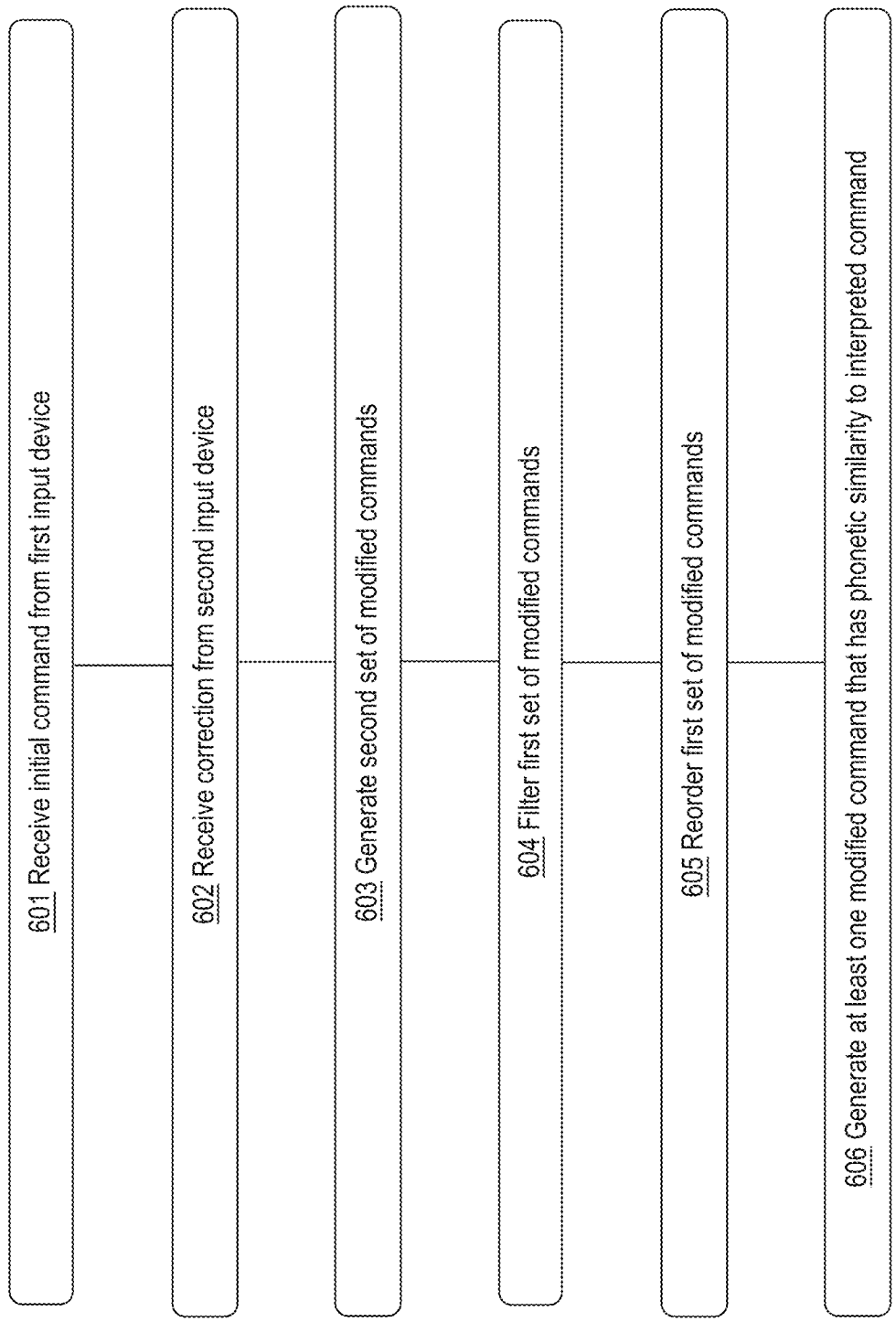
FIG. 6 illustrates an example computer process that uses multimodal interactivity to refine modified commands and accelerate accurate interpretation of an intended command.

FIG. 6 illustrates an example process performed by an embodiment of interactive system 100 and specifically computer device 102 that uses multimodal interactivity to refine modified commands and accelerate accurate interpretation of an intended command. In this example, multimodal interactivity involves using different input devices while refining a user command.

In an embodiment, the computer device 102 in step 601 receives initial command 321 from a first input device such as microphone 114. As discussed earlier herein, processing of initial command 321 initiates a sequence of activity that includes generation of modified commands 341 by recommendation generators 330 and presentation of modified commands 341 through an output device.

In an embodiment, the computer device 102 in step 602 receives response 360 as an interactive correction from a second input device such as handheld remote 116. For example, handheld remote 116 may comprise a partial or full keyboard through which the user may enter an alphanumeric character. The handheld remote could also be used as an air mouse to point to an object representing a specific character, command, or anything else on a screen. For example, the user may type the letter P to indicate that the intended command begins with or contains the letter P or contains a word that begins with the letter P. The user could also point to a graphically represented folder on the screen to indicate that the command refers to that folder or contains the letter F.

In an embodiment, the computer device 102 in step 603 generates refined set of modified commands 342 based on interpreted command 322, modified commands 341, and the user's further response, such as a specification of the letter P. For example, the computer device 102 in step 604 may generate modified commands 342 by filtering away those of modified commands 341 that do not contain a word that starts with P.

In some embodiments, computer device 102 can filter the first set of modified commands. A modified command may have a confidence score that is a statistical probability that measures the likelihood that the user will select the modified command for execution. For example, a recommendation generator may calculate a confidence score for a modified command generated by that recommendation generator. Likewise, computer device 102 may calculate respective confidence scores for all modified commands. For stateful generator 334, confidence score calculation may be based on correlations mined from a command log such as frequency or recency of past acceptance of a same modified command. Confidence scores could also be based in inherent similarity or distance measures for phonetic generator 331 or semantic generator 333. For expansion generator 332, confidence scores could be based on the amount of expansion, for example. Computer device 102 can directly take normalized scores produced by individual recommendation generators or use other approaches instead of or in addition, such as a user's profile. Filtering need not be expressly based on word presence, and may instead be based on a confidence threshold. For example, the letter P as a correction may cause respective confidence scores of modified commands 341 to be recalculated as discussed later herein. In that case, some or all commands without words containing P or having P in a specific position may fall beneath the confidence threshold and be filtered away.

Additionally or instead, the computer device 102 in step 605 may generate modified commands 342 by reordering modified commands 341. For example, those of modified commands 341 that contain a word that starts with P may be promoted to the top of the list in modified commands 342. If sorting is based on confidence scores, then those modified commands with words that start with P may sort to the top of modified commands 342 due to increased confidence. Likewise, modified commands 342 may contain newly generated modified commands that were not in modified commands 341. For example, the user might point to an object on the screen that has no apparent relationship to any of the modified commands. Those newly generated modified commands may have increased confidence due to generation based on additional information such as response 360, which may cause newly generated modified commands to sort to the top of modified commands 342.

For example, the computer device 102 in step 606 may generate at least one of modified commands 342 that has phonetic similarity to interpreted command 322, as discussed above. For example, "text" is phonetically similar to "next", and "page" is phonetically similar to "stage". In that case, new commands in modified commands 342 may be generated that include "text" or "page" or both. In one scenario, the user corrects a voice transcription error by typing letter P as response 360 so that modified commands 342 may contain "photo" when interpreted command 322 contains "foto". As discussed earlier herein, step 606 may occur when initial command 321 and response 360 are typed instead of spoken. For example if initial command 321 includes a typographic spelling error such as "foto" and response 360 consists of typed letter P as a correction, then some of modified commands 342 may include "photo".

In some embodiments, a user command could be issued simultaneously through multiple modalities. The different pieces of input data captured by the input devices may not be congruent with one another. For example, a camera might have captured a user gesturing "open" while a microphone may at the same time have captured the user speak "close" or "timer". In this case, the computer device 102 can rely on the command log, as described herein, prioritize the input data from one input modality over the input data from another input modality based on the user profile or predetermined list of priorities of input devices, or generate a modified command for each modality to see whether they reconcile. On the other hand, the different pieces of input data captured by the input devices may be congruent with one another. The computer device 102 may then take advantage of this congruence to interpret the initial demand or recommend modified commands.

4.5. Interjection Triggers and Command History

Figure 7:
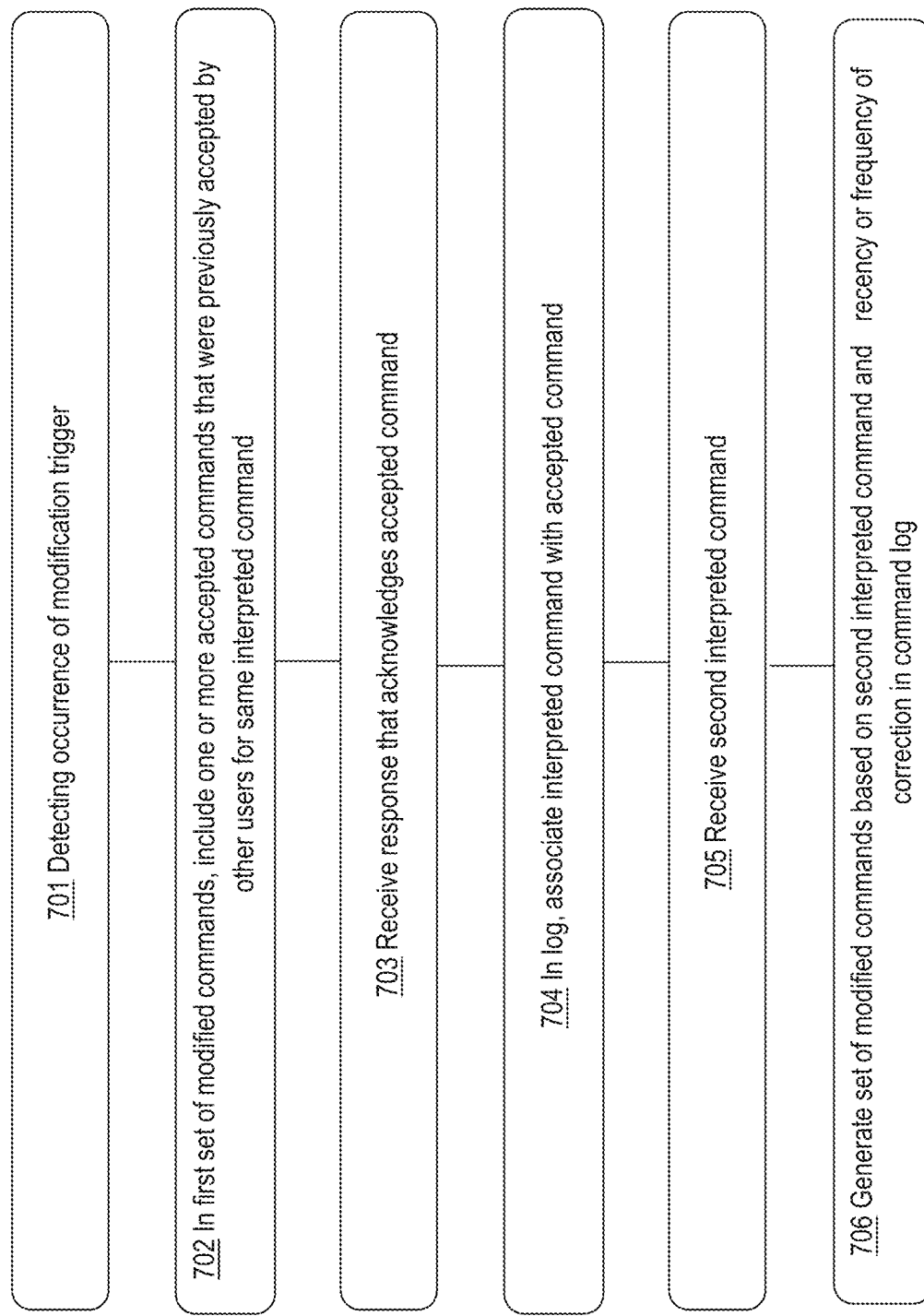
FIG. 7 illustrates an example computer process that uses interjection triggers and a command log in various ways for various purposes to accelerate interpretation of an accurate command as intended by the user.

FIG. 7 illustrates an example process performed by an embodiment of interactive system 100 or specifically computer device 102 that uses interjection triggers and a command log in various ways for various purposes to accelerate interpretation of an accurate command as intended by the user. Although discussed with reference to the command log, an embodiment may instead have a richer command log such as 1010 that is presented later herein.

As discussed earlier herein, processing of initial command 321 may: a) cause generation and presentation of modified commands 341 to ensure that command execution does not occur until computer device 102 has detected which command the user intends or b) due to calculated high confidence of interpreted commands, execute many or most user commands directly and immediately. In other words, generation of modified commands 341 may be needed in many cases. In that case, the computer device 102 in step 701 detects whether or not modified commands 341 needs generation for interpreted command 322 in an embodiment. For example, the computer device 102 in step 701 may detect an occurrence of any of various interjection triggers that indicates that modified commands 341 are needed. An embodiment may implement some or all of the following triggers.

An interjection trigger may fire when a confidence score that is calculated for the interpretation of initial command 321 is less than a transcription threshold. For example, noise or accent may cause transcription of initial command 321 to be somewhat ambiguous or of detectably diminished accuracy, in which case transcription confidence would be calculably low and further guidance by the user for clarity may be prompted by generating and presenting modified commands 341.

In an embodiment, ambiguous transcription entails multiple alternate transcriptions. For example, a transcription confidence score may be a statistical probability that a respective alternate transcription is correct, and such probabilities may sum to less than or equal to one (i.e., 100%). For example, an utterance may yield alternative transcriptions that respectively contain "sage" and "stage" due to tonal proximity. For example, interpreted command 322 may contain multiple alternate transcriptions and may or may not contain respective transcription confidences. In some cases, one of the transcription confidences is significantly higher than the others for a same utterance. In that case, the low confidence transcriptions may be discarded. In other cases, no alternative transcription stands out as having higher confidence. For example, multiple alternative transcriptions may have a transcription confidence that exceeds a transcription threshold. When a count of the multiple alternative transcriptions having sufficient confidence exceeds a cluster threshold (e.g., more than one confident transcription), then generation of modified commands 341 is triggered.

Regardless of transcription confidence, interpreted command 342 may or may not be a valid command. For example, few commands consist of only one word, and most individual words are not valid commands by themselves. Even though most valid commands may consist of multiple words, most combinations of a few words may be invalid. Invalidity may be based on natural language processing (NLP) that parses interpreted command 342 into words such as objects and verbs. If the computer device 102 does not recognize an object or a verb, the parsed command violates syntax rules such as presence of a verb, the parsed command includes a combination that was never seen before or was deemed not actionable, then interpreted command 342 is invalid. Interpreted command 342 being invalid may trigger generation of modified commands 341.

As discussed earlier herein, modified commands 341 may be based on historical interactions such as recorded in the command log. For example, an interjection trigger may be based on automatic analysis of command log(s) to generate modified commands 341. In modified commands 341, the computer device 102 in step 702 includes one or more accepted commands that were previously accepted by the user or one or more other users for same interpreted command 322. For example, data mining of the command log may indicate that an initial command transcribed as "turn lift" was usually modified or refined and accepted as "turn left" by the user. Likewise, data mining of command logs of other users may indicate that transcribed "turn lift" was usually refined and accepted as "turn left" by other users. In that case, an interpreted command of "turn lift" can automatically trigger the generation of modified commands. The modified command "turn left" may be automatically promoted in various ways such as an increased confidence score, sorting toward the top of modified commands 341 or, due to high confidence, speculative execution without interactive acceptance by response 360 as discussed later herein.

The command log may contain a dynamically growing list of interactions. For example, as discussed earlier herein, the computer device 102 in step 703 may receive response 360 that acknowledges one of modified commands 341 as accepted by the user. In the command log, the computer device 102 in step 704 may associate interpreted command 322 with the accepted modified command. Thus, computer device 102 will be able to leverage the confirmation of the accepted command when generating future modified commands for the same or different user such as in step 702 above. The command log may be used by computer device 102 as a source for data mining and machine learning. For example, if such data mining detects that the user tends to use a particular input device, computer device 102 may give that input device precedence over other input devices when they are used together. For example, if the user tends to confirm a recommended modification, in a future occurrence of a same initial command 321, the computer system 102 may directly cause displaying that recommended modification as the interpreted command instead of asking the user to confirm the modification again.

The computer device 102 in step 705 receives a second interpreted command that may or may not be related to interpreted command 322. The computer device 102 in step 706 may generate a set of modified commands for the second interpreted command based on recency or frequency of corrections in the command log. For example, the computer device 102 may detect that an inaccurate transcription of a word or a whole utterance repeatedly has a same interactive correction as discussed above. For example, rigid audio transcription logic that mistakenly transcribes "page" as "age" may, throughout many interactive sessions at different times, repeatedly degrade transcription of multiple related and unrelated commands that all were intended to contain "page" as the command log may reveal. By recency or frequency of a same accepted command in a recent part or entirety of the command log and/or command logs of other users, "page" may be automatically identified as a modification of "age". For example, accepted commands in the command log that are appropriate for interpreted command 322 may be ranked or compared to a threshold according to recency and/or frequency in the command log, and such recency or frequency may be used to adjust a respective confidence of a previously accepted command when proposing the accepted command as a modified command.

4.6. Interactive Context

Recency of commands may be especially relevant for context cohesion because contemporaneous or sequential commands may operate in ways that are related to an ongoing context. For example, related commands may cooperate to achieve an intended goal, or related commands may operate on a same object or within a same set of objects. Suitability of generated modified commands may increase when based on a current usage context, which may or may not involve analysis of the command log.

Figure 8:
FIG. 8 illustrates an example computer process that generates modified commands based on an ongoing interactive context that may have any of various forms.

FIG. 8 illustrates an example process performed by an embodiment of interactive system 100 and specifically the computer device 102 that generates modified commands based on an ongoing interactive context that may have any of the following forms.

A context may comprise a sequence of one or more previous user commands that occurred recently or historically. For example, an interactive context is ongoing and may accumulate additional commands, and a historical context can comprise a fixed and finished set of commands. In either case, commands in a context may be available as recorded in the command log. Generation of modified commands may be based on a portion of the command log that occurred during the context, as discussed later herein.

More broadly, a context may comprise information regarding anything taking place in the surroundings, such as the execution of a computer application, the operation of any equipment, the communication between users, or the condition of the surroundings. Such information can be collected by a processor or a sensor, communicated to the computer device 102, and used collectively by the computer device 102 in proposing modified commands. A context may be based on a communication with one or more other users. Such contexts include composing an email, participating in a phone call or teleconference, or participating in an instant messaging conversation. Generation of modified commands may be based on details of an ongoing communication. For example, a modified command may propose sending or reading aloud an email currently being composed, or muting, terminating, or adjusting the audio volume of a current call.

An interpersonal communication may be shown on a screen. The screen thus may provide a context for modified commands based on details such as a label of a currently edited field, a title of a current screen, or data already interactively entered in an adjacent field. For example, proposal of a modified command that correctly spells a known person's last name may be based on an already entered first name, such as that of the user. In another example, the computer device 102 detects a chat window displayed on a smartphone, extracts context information from the chat window, and determines that the command should be interpreted as starting a video conference with a particular person or looking up a word mentioned in the chat. Computer device 102 may use whatever is already being outputted (e.g., displayed) or existing in the environment as an interactive context.

In some contexts, the user is generally passive such as when consuming a media stream such as music or a movie. The interactive system can determine, using an audio analysis method known to someone skilled in the art, that a certain song or movie is playing on an output device in the foreground. Generation of modified commands may emphasize ways to control the media stream such as pausing, restarting a current scene from its beginning, or identifying an involved artist. For example, uttering "again" may cause modified commands such as "restart scene" and "restart movie". In some embodiments, the computer device 102 can pre-associate certain verbs with appropriate actions depending on the context or learn such associations from a history of command modifications. For example, "next" could be associated with "next scene" when a user is watching a video, or "next tab" when the user is browsing the web. Similarly, "again" could be associated with "restarting a scene" when the user is watching a video and "refreshing the webpage" when the user is browsing the web.

In some embodiments, the interactive system can determine that a web browser is running or even that an Internet search is being accessed, by examining the list of active user processes on the machine on which the web browser is running or by analyzing a screen of the machine on which the web browser is running using an image analysis method known to someone skilled in the art. A webpage in a web browser may provide a context, either as a data entry screen as discussed above or in a less interrogatory way. For example, modified commands may emphasize browsing activities such as scrolling, hyperlink activation, and backward navigation. For example, uttering "no" may cause modified commands such as "navigate back" and "close tab". A search, such as a web search or a search of smartphone content or a search of a commercial content library, may provide a context that may cause modified commands that emphasize refining the search or processing search results. For example, uttering "quotes" may cause a modified command that consists of an initial search query as a quoted phrase.

An interactive menu of choices, displayed or emitted as synthesized speech, may provide a context. For example, an utterance that does not match any menu item may cause whichever menu item is phonetically, literally, or semantically most similar to the utterance to be provided as a modified command.

In some embodiments, the system can scan the room via one or more input devices and detect that other users or certain devices are located near the user issuing a command using any image analysis method known to someone in the art. The system may match the extracted image with predetermine information about individuals or devices and include such information in the context. For example, when the user points to a person or a device, the system can refine a recommended modification accordingly.

As discussed above, there are many kinds of interactive contexts. Steps 801-807 provide example activities that may occur with a context and that may leverage a past or current context as follows.

Within an interactive context, the computer device 102 in step 801 receives initial command 321 in an embodiment. For example, initial command 321 may be an utterance that is garbled, abbreviated, or otherwise causes interpreted command 322 to have low confidence that triggers generation of many modified commands.

In an embodiment, the computer device 102 in step 802 uses recommendation generators 330 to generate many unfiltered modified commands based on the current interactive context. Although many or all of the unfiltered modified commands may be tailored for the interactive context, confidences calculated for the unfiltered modified commands may be low. There may be too many unfiltered modified commands and/or too many with low confidence. In that case, automatic filtering may be needed such as follows. In an embodiment, filtering may be unrelated to history or context, but is based on appropriateness for a user such as esoteric words inappropriate for a 12-year-old.

Based on the interactive context, the computer device 102 in step 803 selects modified commands 341 from the unfiltered modified commands in an embodiment. For example, respective confidence scores of modified commands 341 may be increased or decreased based on: a) whether the respective generator considered the context when generating the modified command or b) how appropriate or relevant the modified command is for the context. For example, the kinds of contexts discussed above may each have a respective collection of relevant words. For example, email, copy, paste, to, cc, subject, and body are a-priori highly relevant words for an email context. Likewise, relevant words may instead be discovered through data mining of the command log of the current or more users. Although not shown, the command log may have a column that records context type.

In those ways, the computer device 102 in step 803 may adjust confidence scores of modified commands based on context. With or without context adjustments, the computer device 102 in step 804 compares respective confidence scores of the unfiltered plurality of modified commands to a confidence threshold in an embodiment. Only unfiltered modified commands that exceed the threshold are retained in modified commands 341, and the low confidence unfiltered modified commands are discarded.

With or without confidence thresholding in step 804, the computer device 102 in step 805 compares a count of unfiltered modified commands to a count threshold in an embodiment. If there are too many modified commands, some modified commands are discarded such as those of least confidence or those that are not suited for the context.

In an embodiment, the computer device 102 in step 806 compares the unfiltered modified commands to the command log. For example, adjustment of confidence scores or outright filtering of modified commands may be based on recency, frequency, or presence of an unfiltered modified command as an accepted command in the command log or the portion of the command log that records commands of the current context or current kind of context. For example, a command that was never received or confirmed by a user may be ranked low and ultimately filtered out.

In those ways, data mining of the command log of the current or other users may adjust the confidence of modified commands. In similar ways, the reliability of each of recommendation generators 330 may be measured such as based on recency, frequency, or numerosity of modified commands accepted by the user. Specifically, the reliability score of a generator may be increased based on recencies, counts, or percentage of modified commands that were generated by that generator and were accepted. For example, if a user tends to choose a phonetically similar command, that recommended modification based on a close phonetic distance should take precedence over other recommended modification. In an embodiment, the computer device 102 in step 807 selects modified commands 341 from unfiltered modified commands based on respective reliability scores of generators that generated unfiltered modified commands. For example, the computer device 102 in step 807 may adjust confidence scores of modified commands based on reliability scores of respective generators.

4.7. Speculative Execution

Figure 9:
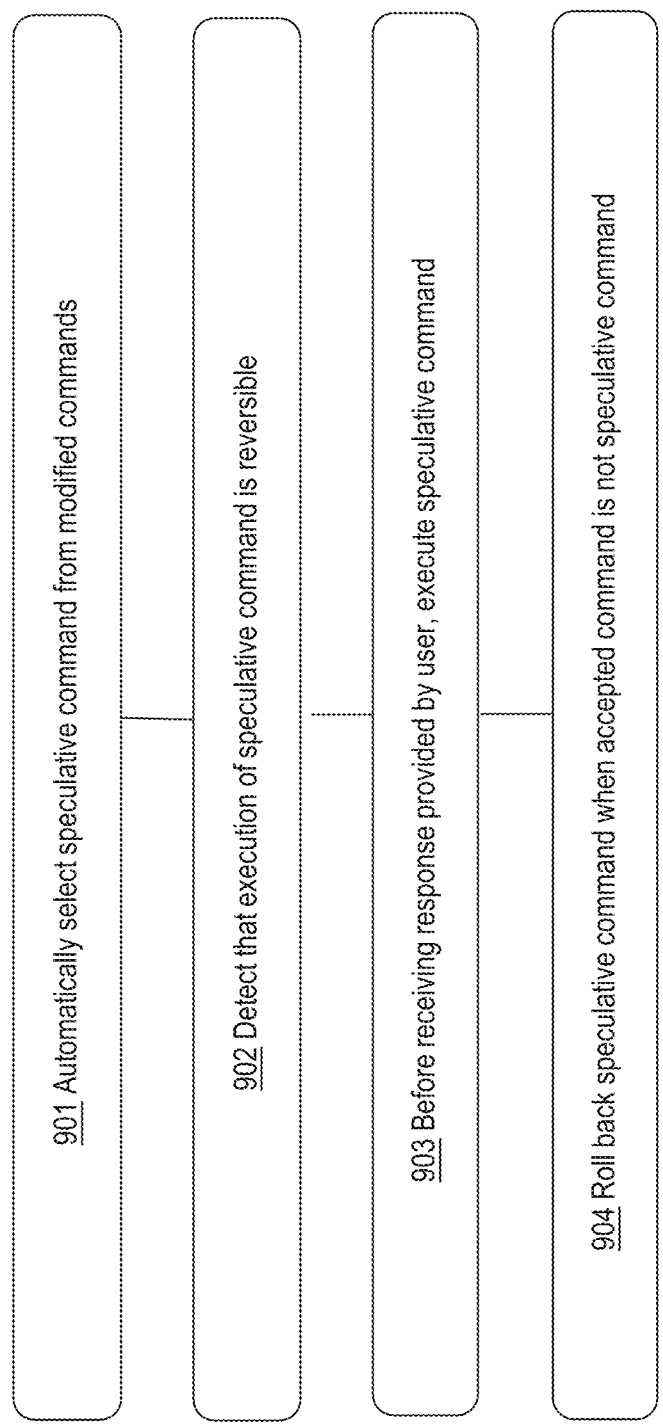
FIG. 9 illustrates an example computer process that speculatively executes a reversible command.

FIG. 9 illustrates an example process performed by an embodiment of interactive system 100 and specifically computer device 102 that can speculatively execute a reversible command.

A design goal of interactive system 100 is command acceleration by detecting user intent sooner. In an embodiment, the computer device 102 in step 901 automatically selects a speculative command from modified commands 341. For example, one modified command may have a much higher confidence score than others of modified commands 341 such that the computer device 102 in step 901 may select that modified command for preview as reflecting the intent of the user.

In an embodiment, the computer device 102 in step 902 detects that execution of the speculative command would be reversible or harmless. For example, even though the accuracy of the modified command that is a search command may be unknown, the search command can safely be speculatively executed because the time, cost, and impact of a mistaken search is below a certain threshold. For example, the user can freely ignore the mistaken search results and instead confirm a different modified command as accepted. The computer device 102 in step 902 may consult a predefined list of commands or verbs that are reversible and/or harmless. Thus, the computer device 102 in step 902 detects whether or not the speculative command is safe to preemptively execute, in which case the computer device 102 in step 903 executes the speculative command before receiving response 360 from the user. If the interactive system determines that a recommended modification would not be reversible, the interactive system would not present a preview of the result of executing the recommended modification.

The computer device 102 in step 904 rolls back the speculative command when response 360 indicates that the accepted command is not the speculative command. For example, if the speculative command renamed an object, then the computer device 102 in step 904 undoes the rename by reinstating the previous name of the object. After roll back, response 360 may be further processed as discussed earlier herein. For example, the accepted command may be executed.

4.8. Command Log and Machine Learning

Figure 10B:
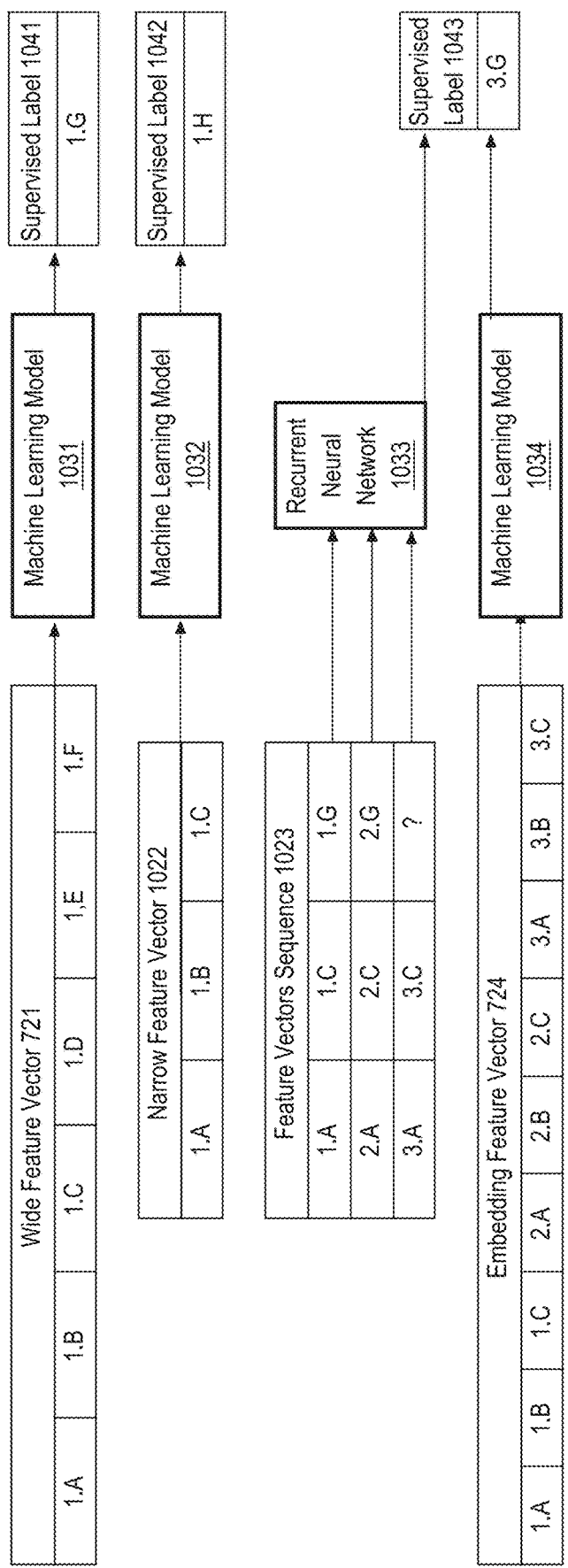
FIG. 10B is another block diagram that illustrates an example computer that may generate various feature vectors that encode one row or a few related rows of a command log as input to various ML models.

FIGS. 10A and 10B illustrate components of an example computer 1000 that may be an implementation of computer device 102. As discussed earlier herein, computer 1000 may be configured for various usage scenarios, strategies and mechanisms for implementing recommendation generators, and ways to arrange, filter, and refine modified commands after generation. As shown in FIG. 10A, computer 1000 stores rich command log 1010 that may be horizontally and vertically sliced in various ways for data mining and for data-driven behaviors such as personalization, contextualization, and machine learning. As shown in FIG. 10B, computer 1000 may generate various feature vectors 1021-1024 that encode one row or a few related rows of command log 1010 as input to respective ML models 1031-1034, some or all of which computer 1000 may implement.

Supervised ML may be implemented as a pair of data-driven algorithms that are training and inferencing. An ML model is a data structure that contains highly adjustable data that represents learned pattern recognition. Inferencing entails applying an ML model to a feature vector that contains input data that describes an object or event to cause the ML model to generate an inference that characterizes the object or event. A feature vector contains data fields that correspond to attributes of the object or event. Depending on the ML model, the inference may be a classification, a prediction, a detection, or a regression. An ML model may have any of various architectures such as an artificial neural network (ANN), a decision tree or random forest, or a support vector machine (SVM). The training is typically performed offline to generate and store an ML model and updated periodically to incorporate new data. The inferencing would be performed in real time in response to receiving new data from which features required by the ML model can be extracted and fed into the ML model.

Computer 1000 may implement training, inferencing, or both. For example, an ML model may train on one computer for deployment on other computers. In the shown embodiment, operation of ML models 1031-1034 is based on one or more command logs, such as 1010, that contain records of historical interactivity as discussed earlier herein. Each row of command log 1010 stores one of entries 1-9 that each represents attributes of a respective user command. Each attribute is stored in a respective column shown as fields A-H that are as follows. Command log 1010 may implement some or all of fields A-H and/or additional fields.

Field A identifies a context or a type of context. For example, entries 1-3 occurred during a same context that entailed browsing photos. Field B identifies which input device received an initial command from a user such as an utterance. Field C contains the interpreted command that was transcribed from the initial command.

Field D identifies which input device received the response, correction, confirmation, or acknowledgement from the user for the interpreted command or a modified command as an accepted command. Field E stores the content of the response. Field F indicates the type of the response. Field G stores the accepted command that may be the interpreted command or a modified command. Field H identifies which recommendation generator generated the modified command that the user accepted.

In other embodiments, the interactive system can record even more detailed information, reflecting most of all of user actions. For example, the reason why the modification of an interpreted command is triggered can be recorded into the command log. The rejection of a recommended modification can be recorded into the command log. Key information regarding the user can be included to or at least linked from the command log for machine learning, or such information could be incorporated into Field A. If an initial command is modified several times before user acceptance, each around could be recorded as a row in the command log or the entire process could be condensed and recorded as a row in the command log.

As shown, ML models 1031-1034 accept different respective feature vector formats that respectively contain various horizontal and vertical slices of command log 1010 that isolate various subsets of fields A-H and entries 1-9 for various purposes. Feature vectors 1021-1023 encode one entry of command log 1010 per feature vector.

In feature vectors 1021-1024, each value encodes a value of a field of an entry. The encoded value is demonstratively shown such as 1.A that indicates the value of field A for entry 1, which is a "browsing photos" context as shown in entry 1. All values in a same field have a same datatype. Although different fields may have different datatypes, any field value may be encoded into a feature vector as a real number. In other words, a feature vector may be an array of real numbers. For example, an integer value may be readily encoded as a real number. A Boolean value may be encoded as a one or zero.

In an embodiment, wide feature vector 1021 contains values for fields A-F of entry 1 that are many or most of the fields of command log 1010. Thus, wide feature vector 1021 is a rich encoding of entry 1 that facilitates ML model 1031 learning subtle patterns and edge cases. As shown in supervised label 1041, ML model 1031 predicts field G based on fields A-F. That is, given aspects of an interpreted command and aspects of a response to a recommended modification, ML model 1031 can detect which command is the user currently accepting. For example, if the response is a typed character that matches more than one modified command, then there may be ambiguity as to which of multiple matching modified commands the user intends to accept. By predicting which modified command is intended for acceptance, computer 1000 may react in various ways such as: a) filtering, reordering, or recalculating confidences of modified commands, b) generating new and more accurate modified commands, or c) speculatively executing the modified command that is predicted as acceptable.

In an embodiment, narrow feature vector 1022 contains only fields A-C that are a reduced or minimal subset of fields in entry 1. As shown in supervised label 1042, ML model 1031 predicts field H based on fields A-C. That is, given aspects of an interpreted command, ML model 1031 can predict which recommendation generator will generate the modified command that the user will accept. For example, as shown, ML model 1032 predicts 1.H for narrow feature vector 1022, which means that the phonetic recommendation generator will generate is best used for generating recommended modifications. By predicting the correct recommendation generator, computer 1000 may react in various ways such as: a) increasing the confidence scores of modified commands generated by that generator, b) using that generator to generate more modified commands than other generators do, b) filtering or reordering modified commands based on whether or not they were generated by that generator, or c) speculatively executing a modified command that was generated by that generator.

As discussed above, ML models 1031 and 1032 predict one field of one entry based on other fields of the same entry, which is more or less a stateless activity. For example, inferences by ML models 1031 and 1032 are not based on whether entry 1 occurs first or last in the "browsing photos" context or in command log 1010. Also with statelessness, it does not matter which other entries are adjacent to a given entry. Such statelessness may limit what kinds of information can be predicted and/or how accurate is the prediction.

ML models 1033 and 1034 are stateful and vary their predictions based on which other entries are adjacent to a given entry. Thus, ML models 1033 and 1034 may have increased accuracy and may be well suited to an ongoing dialog, session, or context that entails a sequence of somewhat related or cooperating commands. ML models 1033 and 1034 are stateful by simultaneously processing multiple adjacent entries to generate one inference. That is, ML models 1033 and 1034 simultaneously process a horizontal slice of command log 1010 that contains multiple entries. ML models 1033 and 1034 are distinct from each other in how many feature vectors are needed to encode that horizontal slice, which also is how many feature vectors ML models 1033 and 1034 respectively process to generate one inference. For example as shown, both feature vectors 1023 and 1024 respectively encode components of same entries 1-3 in different ways as follows.

In an embodiment, feature vectors sequence 1023 is a set of three related feature vectors that respectively encode entries 1-3. Recurrent neural network 1033 is an ML model that simultaneously processes three feature vectors to generate one inference. As shown in supervised label 1042, recurrent neural network 1033 predicts field G based on fields A, C, and G of three feature vectors that respectively encode two past entries 1-2 and current entry 3. The question mark demonstratively indicates the value of field G is unknown for entry 3 because the user has not yet accepted a modified command for current entry 3. That is, given aspects of a current interpreted command and given aspects of the previous two commands and responses, ML model 1033 can predict which modified command will the user accept for current entry 3. Inferred value 3.G means that recurrent neural network 1033 predicts that the user intends to "zoom in" as shown in entry 3. In an embodiment, recurrent neural network 1033 may contain long short-term memory (LSTM).

An advantage of recurrent neural network 1033 is that each feature vector is small. However, by instead using larger embedded feature vector 1024, ML model 1034 may more or less be as stateful and as accurate as recurrent neural network 1033 but with a more compact internal architecture. In other words, ML model 1034 may sacrifice input density to reduce model density.

In an embodiment, embedding feature vector 1024 is a concatenation via embeddings of the three vectors in feature vectors sequence 1023 into a single feature vector. In other words, embedding feature vector 1024 encodes components of multiple entries into a single feature vector that ML model 1034 can process to generate 3.G as shown. An advantage of ML model 1034 is that it may be implemented by non-neural architectures and model architectures that are not internally stateful.

As discussed above, training may be supervised and based on supervised labels such as 1041-1043. In an embodiment, training instead is unsupervised, which means that measuring inference accuracy during training is not based on known correct values of a field in command log 1010. Thus, unlike ML models 1031-1034, an unsupervised ML model that uses command log 1010 for generating feature vectors may instead be trained to predict data that is not recorded in command log 1010, to identify similar commands or recommended modifications, and so on. For example, various ML model architectures such as a neural autoencoder can facilitate inference accuracy measurement without supervised labels based on techniques such as comparing a copy of a feature vector as regenerated by the autoencoder to the original feature vector that the autoencoder accepted as input.

In various embodiments, computer 1000 may have different ML models to make predictions of different kinds or to make competing predictions. For example, an ensemble is three or more different ML models that, by generating respective inferences that usually are identical, can effectively vote by majority as to which is the correct inference. In various embodiments, computer 1000 may have a separate ML model for similar inferencing but respectively for each recommendation generator, each context type, or each input device type. Such dedicated ML models may train more intensively for different specialties and thus provide more accurate predictions than a single generalized ML model.

5. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 11:
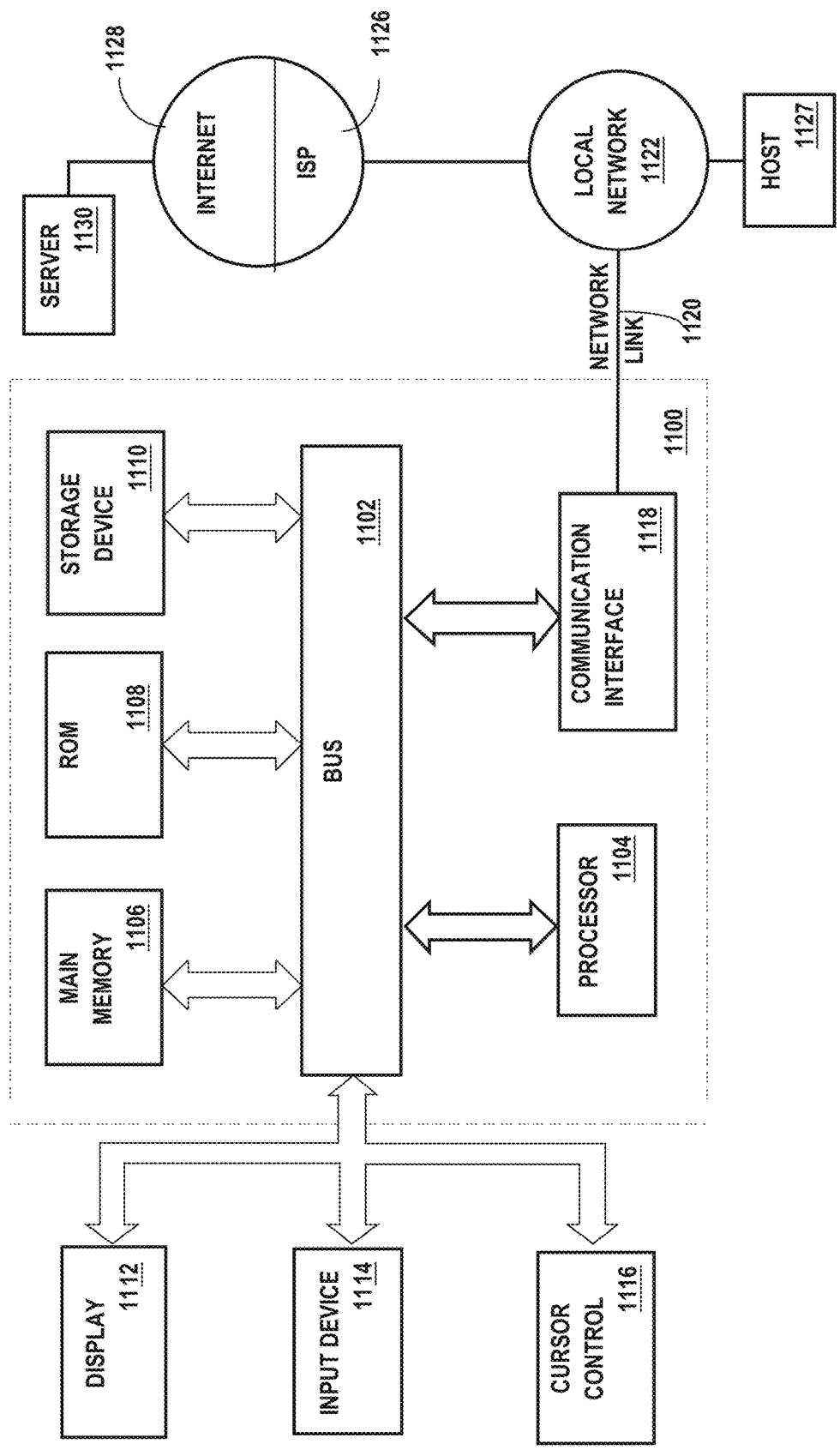
FIG. 11 is a block diagram that illustrates a computer system upon which an embodiment of the invention may be implemented.

FIG. 11 is a block diagram that illustrates an example computer system with which an embodiment may be implemented. In the example of FIG. 11, a computer system 1100 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1100 includes an input/output (I/O) subsystem 1102 which may include a bus and/or other communication mechanism(s) for communicating information and/or instructions between the components of the computer system 1100 over electronic signal paths. The I/O subsystem 1102 may include an I/O controller, a memory controller and at least one I/O port. The electronic signal paths are represented schematically in the drawings, for example as lines, unidirectional arrows, or bidirectional arrows.

At least one hardware processor 1104 is coupled to I/O subsystem 1102 for processing information and instructions. Hardware processor 1104 may include, for example, a general-purpose microprocessor or microcontroller and/or a special-purpose microprocessor such as an embedded system or a graphics processing unit (GPU) or a digital signal processor or ARM processor. Processor 1104 may comprise an integrated arithmetic logic unit (ALU) or may be coupled to a separate ALU.

Computer system 1100 includes one or more units of memory 1106, such as a main memory, which is coupled to I/O subsystem 1102 for electronically digitally storing data and instructions to be executed by processor 1104. Memory 1106 may include volatile memory such as various forms of random-access memory (RAM) or other dynamic storage device. Memory 1106 also may be used for storing temporary variables or other intermediate information during execution of instructions to be executed by processor 1104. Such instructions, when stored in non-transitory computer-readable storage media accessible to processor 1104, can render computer system 1100 into a special-purpose machine that is customized to perform the operations specified in the instructions.

Computer system 1100 further includes non-volatile memory such as read only memory (ROM) 1108 or other static storage device coupled to I/O subsystem 1102 for storing information and instructions for processor 1104. The ROM 1108 may include various forms of programmable ROM (PROM) such as erasable PROM (EPROM) or electrically erasable PROM (EEPROM). A unit of persistent storage 1110 may include various forms of non-volatile RAM (NVRAM), such as FLASH memory, or solid-state storage, magnetic disk or optical disk such as CD-ROM or DVD-ROM, and may be coupled to I/O subsystem 1102 for storing information and instructions. Storage 1110 is an example of a non-transitory computer-readable medium that may be used to store instructions and data which when executed by the processor 1104 cause performing computer-implemented methods to execute the techniques herein.

The instructions in memory 1106, ROM 1108 or storage 1110 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1100 may be coupled via I/O subsystem 1102 to at least one output device 1112. In one embodiment, output device 1112 is a digital computer display. Examples of a display that may be used in various embodiments include a touch screen display or a light-emitting diode (LED) display or a liquid crystal display (LCD) or an e-paper display. Computer system 1100 may include other type(s) of output devices 1112, alternatively or in addition to a display device. Examples of other output devices 1112 include printers, ticket printers, plotters, projectors, sound cards or video cards, speakers, buzzers or piezoelectric devices or other audible devices, lamps or LED or LCD indicators, haptic devices, actuators or servos.

At least one input device 1114 is coupled to I/O subsystem 1102 for communicating signals, data, command selections or gestures to processor 1104. Examples of input devices 1114 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1116, which may perform cursor control or other automated control functions such as navigation in a graphical interface on a display screen, alternatively or in addition to input functions. Control device 1116 may be a touchpad, a mouse, a trackball, or cursor direction keys for communicating direction information and command selections to processor 1104 and for controlling cursor movement on display 1112. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1114 may include a combination of multiple different input devices, such as a video camera and a depth sensor.

In another embodiment, computer system 1100 may comprise an internet of things (IoT) device in which one or more of the output device 1112, input device 1114, and control device 1116 are omitted. Or, in such an embodiment, the input device 1114 may comprise one or more cameras, motion detectors, thermometers, microphones, seismic detectors, other sensors or detectors, measurement devices or encoders and the output device 1112 may comprise a special-purpose display such as a single-line LED or LCD display, one or more indicators, a display panel, a meter, a valve, a solenoid, an actuator or a servo.

When computer system 1100 is a mobile computing device, input device 1114 may comprise a global positioning system (GPS) receiver coupled to a GPS module that is capable of triangulating to a plurality of GPS satellites, determining and generating geo-location or position data such as latitude-longitude values for a geophysical location of the computer system 1100. Output device 1112 may include hardware, software, firmware and interfaces for generating position reporting packets, notifications, pulse or heartbeat signals, or other recurring data transmissions that specify a position of the computer system 1100, alone or in combination with other application-specific data, directed toward host 1124 or server 1130.

Computer system 1100 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1100 in response to processor 1104 executing at least one sequence of at least one instruction contained in main memory 1106. Such instructions may be read into main memory 1106 from another storage medium, such as storage 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1110. Volatile media includes dynamic memory, such as memory 1106. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1102. Transmission media can also take the form of acoustic or light waves, such as those generated during radio-wave and infra-red data communications.

Various forms of media may be involved in carrying at least one sequence of at least one instruction to processor 1104 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1100 can receive the data on the communication link and convert the data to be read by computer system 1100. For instance, a receiver such as a radio frequency antenna or an infrared detector can receive the data carried in a wireless or optical signal and appropriate circuitry can provide the data to I/O subsystem 1102 such as place the data on a bus. I/O subsystem 1102 carries the data to memory 1106, from which processor 1104 retrieves and executes the instructions. The instructions received by memory 1106 may optionally be stored on storage 1110 either before or after execution by processor 1104.

Computer system 1100 also includes a communication interface 1118 coupled to bus 1102. Communication interface 1118 provides a two-way data communication coupling to network link(s) 1120 that are directly or indirectly connected to at least one communication networks, such as a network 1122 or a public or private cloud on the Internet. For example, communication interface 1118 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1122 broadly represents a local area network (LAN), wide-area network (WAN), campus network, internetwork or any combination thereof. Communication interface 1118 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1118 sends and receives electrical, electromagnetic or optical signals over signal paths that carry digital data streams representing various types of information.

Network link 1120 typically provides electrical, electromagnetic, or optical data communication directly or through at least one network to other data devices, using, for example, satellite, cellular, Wi-Fi, or BLUETOOTH technology. For example, network link 1120 may provide a connection through a network 1122 to a host computer 1124.

Furthermore, network link 1120 may provide a connection through network 1122 or to other computing devices via internetworking devices and/or computers that are operated by an Internet Service Provider (ISP) 1126. ISP 1126 provides data communication services through a world-wide packet data communication network represented as internet 1128. A server computer 1130 may be coupled to internet 1128. Server 1130 broadly represents any computer, data center, virtual machine or virtual computing instance with or without a hypervisor, or computer executing a containerized program system such as DOCKER or KUBERNETES. Server 1130 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1100 and server 1130 may form elements of a distributed computing system that includes other computers, a processing cluster, server farm or other organization of computers that cooperate to perform tasks or execute applications or services. Server 1130 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1130 may comprise a web application server that hosts a presentation layer, application layer and data storage layer such as a relational database system using structured query language (SQL) or no SQL, an object store, a graph database, a flat file system or other data storage.

Computer system 1100 can send messages and receive data and instructions, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage 1110, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1104. While each processor 1104 or core of the processor executes a single task at a time, computer system 1100 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of generating modifications to user commands, comprising:
   receiving, by a processor from an input device of a plurality of input devices, an initial command provided by a user, wherein the plurality of input devices are of multiple types, including a microphone;
   interpreting, by the processor, the initial command into an interpreted command;
   generating, by a plurality of recommendation generators operated by the processor, a first set of modified commands that are based on the interpreted command, wherein the plurality of recommendation generators comprises:
      a phonetic generator configured to generate a modified command that has a phonetic similarity to the interpreted command within a certain threshold, and
      a stateful generator configured to generate a modified command by correlating the interpreted command to an earlier command;
   transmitting, by the processor to an output device of one or more output devices, the first set of modified commands;
   automatically choosing a speculative command from the first set of modified commands;
   detecting that execution of the speculative command is reversible;
   executing the speculative command in response to said detecting that execution of the speculative command is reversible;
   receiving, after the executing, by the processor from the plurality of input devices, a response provided by the user, to a group consisting of the interpreted command and the first set of modified commands;
   recording an identifier of an input device from which the response was received and a type of the response in a log;
   when the response includes acknowledging a specific command from the first set of modified commands as an accepted command that is not the speculative command, rolling back the speculative command and executing the accepted command;
   when the response does not include acknowledging any command, generating a second set of modified commands.

2. The computer-implemented method of claim 1, further comprising:
   detecting an occurrence of a interjection trigger selected from a group consisting of:
      a confidence score of the interpreted command based on said interpreting the initial command being less than a transcription threshold,
      a cluster threshold being exceeded by a count of alternate interpretations of said initial command having respective confidence scores that exceed the transcription threshold, and
      the interpreted command being an invalid command based on one or more syntactic or semantic rules;
   wherein said generating the first set of modified commands is in response to said detecting the occurrence of the interjection trigger.

3. The computer-implemented method of claim 1, wherein:
   said generating the first set of modified commands comprises generating an unfiltered plurality of modified commands that contains the first set of modified commands;
   the method further comprises selecting the first set of modified commands from the unfiltered plurality of modified commands by at least one selected from a group consisting of
      comparing respective confidence scores of the unfiltered plurality of modified commands to a confidence threshold,
      comparing a count of the unfiltered plurality of modified commands to a count threshold, and
      comparing the unfiltered plurality of modified commands to the log.

4. The computer-implemented method of claim 3, wherein:
   said receiving the initial command occurs within an interactive context that is based on at least one selected from a group consisting of:
      a set of objects detected to be present in an environment where the plurality of input devices and the one or more output devices are located;
      a set of physical activities being performed in the environment;
      a set of online activities being performed;
      output of the one or more output devices.

5. The computer-implemented method of claim 4, wherein said generating the unfiltered plurality of modified commands is based on the interactive context.

6. The computer-implemented method of claim 4, wherein said selecting the first set of modified commands from the unfiltered plurality of modified commands is based on the interactive context.

7. The computer-implemented method of claim 1 wherein said generating the first set of modified commands comprises including one or more accepted commands that were previously accepted by one or more other users for same said interpreted command.

8. The computer-implemented method of claim 1 wherein:
   said generating the second set of modified commands comprises, based on the response, at least one selected from the group consisting of
      filtering the first set of modified commands,
      reordering the first set of modified commands, and
      generating at least one modified command such that a phonetic similarity between a modified command in the second set of modified commands and the response is below a specific threshold.

9. The computer-implemented method of claim 1 wherein said generating the first set of modified commands comprises determining that the interpreted command is incomplete according to a set of criteria and generating a modified command by adding a word to the interpreted command.

10. The computer-implemented method of claim 1 wherein:
   a particular recommendation generator of the plurality of recommendation generators comprises a machine learning model;
   the method further comprises training the machine learning model based on one or more logs that contain corrections of modified commands by one or more users.

11. The method of claim 1 wherein said detecting that execution of the speculative command is reversible comprises using a predefined list of reversible commands.

12. The method of claim 1 wherein said generating the first set of modified commands comprises generating a command that controls a media stream.

13. One or more non-transitory computer-readable media storing computer-executable instructions that, when executed by one or more processors, cause generating modifications to user commands by:
   receiving, by a processor from an input device of a plurality of input devices, an initial command provided by a user, wherein the plurality of input devices are of multiple types, including a microphone;
   interpreting, by the processor, the initial command into an interpreted command;
   generating, by a plurality of recommendation generators operated by the processor, a first set of modified commands that are based on the interpreted command, wherein the plurality of recommendation generators comprises:
      a phonetic generator configured to generate a modified command that has a phonetic similarity to the interpreted command within a certain threshold, and
      a stateful generator configured to generate a modified command by correlating the interpreted command to an earlier command;
   transmitting, by the processor to an output device of one or more output devices, the first set of modified commands;
   automatically choosing a speculative command from the first set of modified commands;
   detecting that execution of the speculative command is reversible;
   executing the speculative command in response to said detecting that execution of the speculative command is reversible;
   receiving, after the executing, by the processor from the plurality of input devices, a response provided by the user, to a group consisting of the interpreted command and the first set of modified commands;
   recording an identifier of an input device from which the response was received and a type of the response in a log;
   when the response includes acknowledging a specific command from the first set of modified commands as an accepted command that is not the speculative command, rolling back the speculative command and executing the accepted command;
   when the response does not include acknowledging an accepted command, generating a second set of modified commands.

14. The one or more non-transitory computer-readable media of claim 13, wherein:
   said generating the second set of modified commands comprises, based on the response, at least one selected from the group consisting of
      filtering the first set of modified commands,
      reordering the first set of modified commands, and
      generating at least one modified command such that a phonetic similarity between a modified command in the second set of modified commands and the response is below a specific threshold.

15. The one or more non-transitory computer-readable media of claim 13, wherein:
   the computer-executable instructions further cause detecting an occurrence of a interjection trigger selected from the group consisting of:
      a confidence score of said interpreting the initial command is less than a transcription threshold,
      a cluster threshold is exceeded by a count of alternate transcriptions of same said initial command having respective confidence scores that exceed the transcription threshold, and
      the interpreted command is not a valid command;
   said generating the first set of modified commands is in response to said detecting the occurrence of the interjection trigger.

16. The one or more non-transitory computer-readable media of claim 13, wherein:
   said generating the first set of modified commands comprises generating an unfiltered plurality of modified commands that contains the first set of modified commands;
   the computer-executable instructions further cause selecting the first set of modified commands from the unfiltered plurality of modified commands by at least one selected from the group consisting of
      comparing respective confidence scores of the unfiltered plurality of modified commands to a confidence threshold,
      comparing a count of the unfiltered plurality of modified commands to a count threshold, and
      comparing the unfiltered plurality of modified commands to the log.

17. The one or more non-transitory computer-readable media of claim 16, wherein said selecting the first set of modified commands from the unfiltered plurality of modified commands is based on respective reliability scores of the respective recommendation generators that respectively generated the unfiltered plurality of modified commands.

18. The one or more non-transitory computer-readable media of claim 17, wherein:
   said receiving the initial command occurs within an interactive context that is based on at least one selected from the group consisting of:
      a sequence of one or more previous user commands,
      a communication with one or more other users,
      a data entry screen,
      a media stream,
      a webpage,
      a set of search results, and
      a menu of choices;
   a particular operation is based on the interactive context;
   the particular operation comprises at least one selected from the group consisting of:
      said generating the unfiltered plurality of modified commands, and
      said selecting the first set of modified commands from the unfiltered plurality of modified commands.

19. The one or more non-transitory computer-readable media of claim 13, wherein said generating the first set of modified commands comprises including one or more accepted commands that were previously accepted by one or more other users for same said interpreted command.

20. A system for generating modifications to user commands, comprising:
  a processor;
  a memory coupled with the processor,
  one or more non-transitory storage media storing computer-executable instructions, which when executed cause the processor to perform:
    receiving, from an input device of a plurality of input devices, an initial command provided by a user, wherein the plurality of input devices are of multiple types, including a microphone;
    interpreting the initial command into an interpreted command;
    generating, by a plurality of recommendation generators operated by the processor, a first set of modified commands that are based on the interpreted command, wherein the plurality of recommendation generators comprises:
      a phonetic generator configured to generate a modified command that has a phonetic similarity to the interpreted command within a certain threshold, and
      a stateful generator configured to generate a modified command by correlating the interpreted command to an earlier command;
    transmitting, to an output device of one or more output devices, the first set of modified commands;
    automatically choosing a speculative command from the first set of modified commands;
    detecting that execution of the speculative command is reversible;
    executing the speculative command in response to said detecting that execution of the speculative command is reversible;
    receiving, after the executing, by the processor from the plurality of input devices, a response provided by the user, to a group consisting of the interpreted command and the first set of modified commands;
    recording an identifier of an input device from which the response was received and a type of the response in a log;
    when the response includes acknowledging a specific command from the first set of modified commands as an accepted command that is not the speculative command, rolling back the speculative command and executing the accepted command;
    when the response does not include acknowledging an accepted command, generating a second set of modified commands.

* * * * *